(12) United States Patent
Sheng

(10) Patent No.: US 10,716,092 B2
(45) Date of Patent: Jul. 14, 2020

(54) METHOD AND APPARATUS FOR SELECTING RADIO RESOURCES FOR VEHICLE (V2X) COMMUNICATIONS FROM AN OVERLAPPING RESOURCE POOL

(71) Applicants: Sharp Kabushiki Kaisha, Sakai, Osaka (JP); FG Innovation Company Limited, Tuen Mun, New Territories, Hong Kong (CN)

(72) Inventor: Jia Sheng, Vancouver, WA (US)

(73) Assignees: Sharp Kabushiki Kaisha, Sakai, Osaka (JP); FG Innovation Company Limited, Tuen Mun, New Territories, Hong Kong (CN)

( * ) Notice: Subject to any disclaimer, the term of this patent is extended or adjusted under 35 U.S.C. 154(b) by 0 days.

(21) Appl. No.: 15/719,640

(22) Filed: Sep. 29, 2017

(65) Prior Publication Data
US 2018/0092065 A1 Mar. 29, 2018

Related U.S. Application Data

(60) Provisional application No. 62/401,834, filed on Sep. 29, 2016.

(51) Int. Cl.
| | |
|---|---|
| *H04H 20/71* | (2008.01) |
| *H04W 72/02* | (2009.01) |
| *H04W 4/46* | (2018.01) |
| *H04W 74/00* | (2009.01) |
| *H04W 48/10* | (2009.01) |
| *H04W 72/04* | (2009.01) |
| *H04L 29/08* | (2006.01) |

(52) U.S. Cl.
CPC .......... *H04W 72/02* (2013.01); *H04W 4/46* (2018.02); *H04W 48/10* (2013.01); *H04W 72/048* (2013.01); *H04W 74/006* (2013.01); *H04L 67/12* (2013.01)

(58) Field of Classification Search
CPC ....... H04W 72/02; H04W 4/46; H04W 48/10; H04W 72/048; H04W 74/006
See application file for complete search history.

(56) References Cited

U.S. PATENT DOCUMENTS

| | | |
|---|---|---|
| 2015/0043448 A1 | 2/2015 | Chatterjee et al. |
| 2015/0334760 A1 | 11/2015 | Sartori et al. |

(Continued)

OTHER PUBLICATIONS

RP-161298, 3GPP TSG RAN Meeting #72, LG Electronics, Huawei, CATT, "New WI proposal: LTE-based V2X Services", Busan, South Korea, Jun. 13-16, 2016.

(Continued)

*Primary Examiner* — Abdelnabi O Musa
(74) *Attorney, Agent, or Firm* — Nixon & Vanderhye P.C.

(57) ABSTRACT

A pedestrian user equipment (P-UE) which participates in P-UE related V2X communications comprises processor circuitry and a transmitter. The processor circuitry is configured to select a resource pool for a P-UE related V2X communication and to make a determination. The determination, based on a first indicator and/or a second indicator, is whether to transmit the sidelink signal based on sensing using the selected resource pool; or whether to transmit the sidelink signal based on random selection using the selected resource pool. The transmitter is configured to transmit the sidelink signal.

6 Claims, 18 Drawing Sheets

(56) References Cited

U.S. PATENT DOCUMENTS

| | | | |
|---|---|---|---|
| 2016/0174122 A1 | 6/2016 | Sorrentino et al. | |
| 2016/0183276 A1 | 6/2016 | Marinier et al. | |
| 2016/0212721 A1 | 7/2016 | Sheng et al. | |
| 2016/0295624 A1* | 10/2016 | Novlan | H04W 76/14 |
| 2018/0139593 A1* | 5/2018 | Chun | H04W 4/12 |
| 2018/0139594 A1* | 5/2018 | Lee | H04W 52/10 |
| 2018/0146453 A1* | 5/2018 | Hu | H04W 72/005 |
| 2018/0213365 A1* | 7/2018 | Yi | H04W 4/06 |
| 2018/0310147 A1* | 10/2018 | Kim | H04W 4/46 |
| 2019/0075548 A1* | 3/2019 | Lee | H04W 72/02 |

OTHER PUBLICATIONS

3GPP TSG RAN WG1 Meeting #85, "RAN1 Chairman's Notes", Nanjing, China, May 23-27, 2016.

3GPP TSG RAN WG2 Meeting #86, "RAN2 Chairman's Notes", Seoul, Korea, May 19-23, 2014.

R1-1XXXXX, 3GPP TSG RAN WG1 Meeting #86bis, Sharp, "Further Discussions on Power Efficient Sensing for P-UE's", Lisbon, Portugal, Oct. 10-14, 2016.

3GPP TR 22.885 V14.0.0, $3^{rd}$ Generation Partnership Project; Technical Specification Group Services and System Aspects; Study on LTE support for Vehicle to Everything (V2X) services (Release 14) (Dec. 2015).

3GPP TS 36.331 V13.0.0, Technical Specification, $3^{rd}$ Generation Partnership Project; Technical Specification Group Radio Access Network; Evolved Universal Terrestrial Radio Access (E-UTRA); Radio Resource Control (RRC); Protocol specification (Release 13) (Dec. 2015).

RP-151109, 3GPP TSG RAN Meeting #68, LG Electronics, CATT, Vodafone, Huawei, "Feasibility Study on LTE-based V2X Services", Malmö, Sweden, Jun. 15-18, 2015.

RP-152293, 3GPP TSG RAN Meeting #70, LG Electronics, Huawei, HiSilicon, CATT, CATR, "New WI proposal: Support for V2V services based on LTE sidelink", Sitges, Spain, Dec. 7-10, 2015.

3GPP TSG RAN WG1 Meeting #84bis, Busan, Korea Apr. 11-15, 2016, Chairman Notes.

U.S. Appl. No. 62/319,065, filed Apr. 6, 2016, entitled "Resource Selection for Vehicle (V2X) Communications".

U.S. Appl. No. 15/477,299, filed Apr. 3, 2017, entitled "Resource Selection for Vehicle (V2X) Communications".

3GPP TS 36.321 V13.2.0, Technical Specification, $3^{rd}$ Generation Partnership Project; Technical Specification Group Radio Access Network; Evolved Universal Terrestrial Radio Access (E-UTRA); Medium Access Control (MAC) protocol specification (Release 13) (Jun. 2016).

International Search Report and Written Opinion dated Dec. 14, 2017 in PCT Application PCT/US2017/54249.

International Preliminary Report on Patentability dated Apr. 11, 2019 in PCT Application PCT/US2017/54249.

R1-168404, 3GPP TSN RAN WG1 Meeting @86, Session Chairman (Nokia), "Chairman's Notes of Agenda Item 7.2.3 on LTD-based V2X Services", Gothenburg, Sweden, Aug. 22-26, 2016.

* cited by examiner

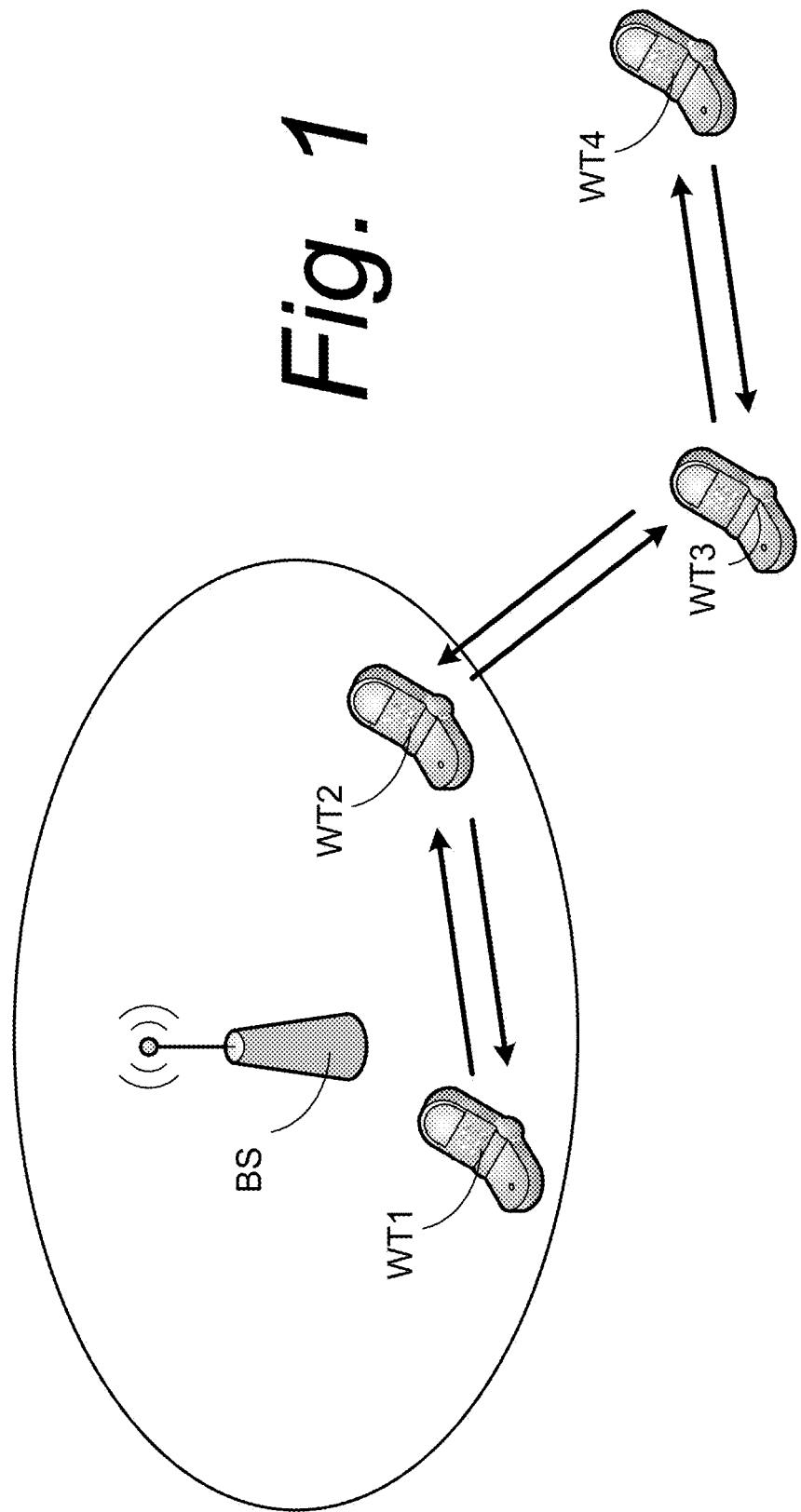

| Tx_ENERGY_THRESHOLD | $X_1$ dBM | $X_2$ dBM | ... | $X_m$ dBM |
|---|---|---|---|---|
| TRANSMISSION PROPERTY EXPRESSION | $TPE_1$ | $TPE_2$ | ... | $TPE_m$ |

52A

| Tx_ENERGY_THRESHOLD | $X_1$ dBM | $X_2$ dBM | $X_3$ dBM | ... | $X_m$ dBM |
|---|---|---|---|---|---|
| PROPERTY1 EXPRESSION/PROPERTY 2 EXPRESSION | $TPE1_1/TPE2_1$ | $TPE1_1/TPE2_2$ | $TPE1_2/TPE2_2$ | ... | m |

52B

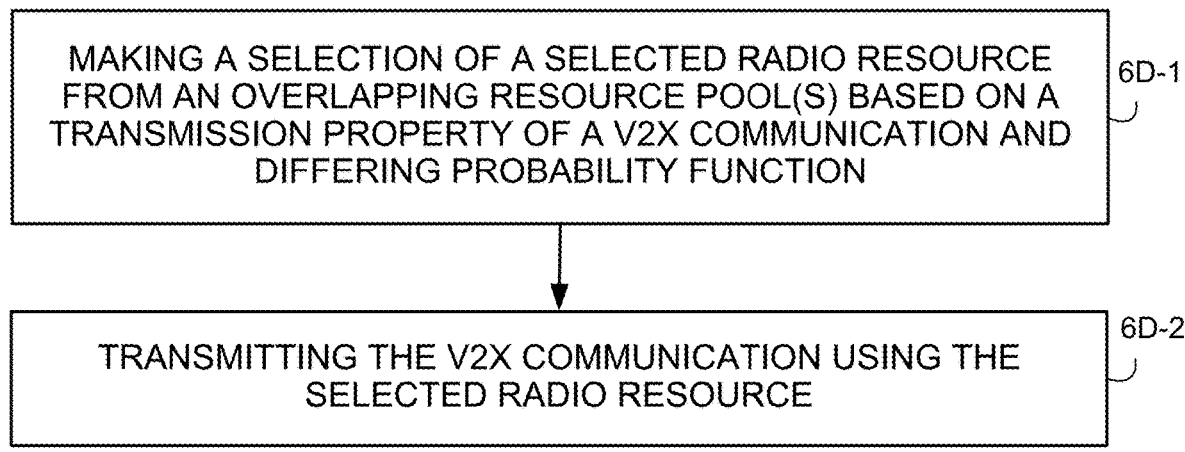
Fig. 6D
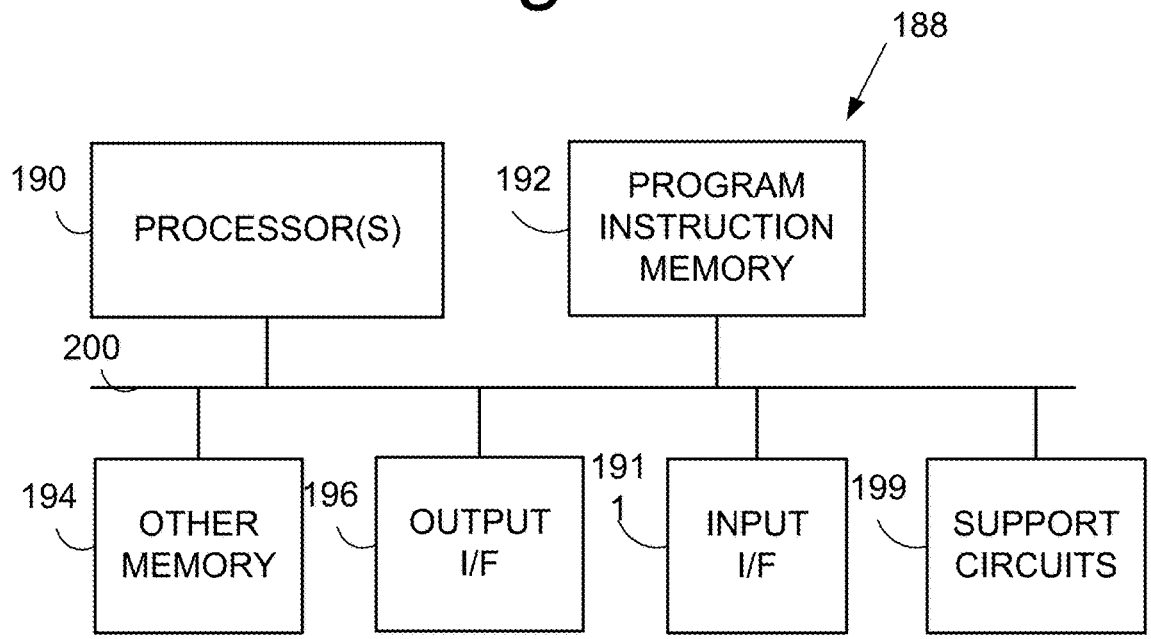
Fig. 9
Fig. 13

```
┌─────────────────────────────────────────┐
│ MAKING A SELECTION OF A SELECTED RADIO  │  6E-1
│ RESOURCE FROM AN OVERLAPPING RESOURCE   │
│ POOL(S) BASED ON A TRANSMISSION         │
│ PROPERTY OF A V2X COMMUNICATION AND     │
│ SWITCH VALUE                            │
└─────────────────────────────────────────┘
                    │
                    ▼
┌─────────────────────────────────────────┐
│ TRANSMITTING THE V2X COMMUNICATION      │  6E-2
│ USING THE SELECTED RADIO RESOURCE       │
└─────────────────────────────────────────┘
```

*Fig. 6E*

```
┌─────────────────────────────────────────┐
│         OBTAINING AN INDICATOR          │  6F-1
└─────────────────────────────────────────┘
                    │
                    ▼
┌─────────────────────────────────────────┐
│ TRANSMITTING THE V2X COMMUNICATION      │
│ USING THE SELECTED RADIO RESOURCE USING │
│ THE INDICATOR TO DETERMINE WHETHER OR   │  6F-2
│ NOT THE UE NEEDS TO SENSE A RESOURCE    │
│ POOL BEFORE A TRANSMITTING A SIDELINK   │
│ SIGNAL                                  │
└─────────────────────────────────────────┘
                    │
                    ▼
┌─────────────────────────────────────────┐
│         SENSING THE RESOURCE POOL       │  6F-1
└─────────────────────────────────────────┘
                    │
                    ▼
┌─────────────────────────────────────────┐
│      TRANSMITTING THE SIDELINK SIGNAL   │  6F-2
└─────────────────────────────────────────┘
```

*Fig. 6F*

| SWITCH VALUE (ON or OFF) | ON | OFF | ... | OFF |
|---|---|---|---|---|
| TPE: PRIORITY | 1 | 2 | ... | m |

Fig. 10A

| SWITCH VALUE (ON or OFF) | ON | OFF | OFF | OFF | OFF |
|---|---|---|---|---|---|
| TPE: SERVICE TYPE | V2V | V2P | V2I | P2V | I2V |

Fig. 10B

| SWITCH VALUE (ON or OFF) | ON | OFF | OFF | OFF |
|---|---|---|---|---|
| TPE: TRAVEL DIRECTION | N | W | S | E |

Fig. 10C

METHOD AND APPARATUS FOR SELECTING RADIO RESOURCES FOR VEHICLE (V2X) COMMUNICATIONS FROM AN OVERLAPPING RESOURCE POOL

This application claims the priority and benefit of U.S. provisional patent application 62/401,834, filed Sep. 29, 2016, which is incorporated herein by reference in its entirety.

TECHNICAL FIELD

The technology relates to wireless communications, and particularly to selecting data radio resources for vehicle (V2X) communications from an overlapping resource pool.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

Currently 3GPP is specifying a new feature for Rel-14 that covers use cases and potential requirements for LTE support for vehicular communications services (represented by the term, Vehicle-to-Everything (V2X) Services). The feature is documented in the TR 22.885 on LTE Study on LTE Support for V2X Services. Contemplated V2X services may include one or more of the following:

V2V: covering LTE-based communication between vehicles.
V2P: covering LTE-based communication between a vehicle and a device carried by an individual (e.g. handheld terminal carried by a pedestrian, cyclist, driver or passenger).
V2I: covering LTE-based communication between a vehicle and a roadside unit. A roadside unit (RSU) is a transportation infrastructure entity (e.g. an entity transmitting speed notifications).

Thus far 3GPP deliberations concerning synchronization for vehicle-to-vehicle (V2V) communications have essentially assumed reuse of LTE sidelink for V2V, e.g., assumed that the V2V communications will essentially be indistinct from sidelink direct communications in the access stratum (AS), e.g., may use the same PC5 radio access interface. As such, it has generally been assumed that the LTE 3GPP resource selection design for SLD would be reused for V2X communication as much as possible. On the other hand, there are still numerous differences between V2X and D2D, such as higher V2X user equipment (UE) density and much higher V2X UE velocity.

What is needed are methods, apparatus, and/or techniques for selecting between pools comprising overlapping radio resources and pools comprising non-overlapping radio resources for vehicle (V2X) communications.

SUMMARY

In one of its various aspects the technology disclosed herein concerns a pedestrian user equipment (P-UE) which participates in P-UE related V2X communications. The P-UE comprises processor circuitry and a transmitter. The processor circuitry is configured to select a resource pool for a P-UE related V2X communication and to make a determination. The determination, based on a first indicator and/or a second indicator, is whether to transmit the sidelink signal based on sensing using the selected resource pool; or whether to transmit the sidelink signal based on random selection using the selected resource pool. The transmitter is configured to transmit the sidelink signal.

In another of its aspects the technology disclosed herein concerns a method in a pedestrian user equipment (P-UE) which participates in P-UE related V2X communications. In a basic example mode the method comprises: selecting a resource pool for a P-UE related V2X communication; making a determination, based on a first indicator and/or a second indicator: whether to transmit the sidelink signal based on sensing using the selected resource pool; or whether to transmit the sidelink signal based on random selection using the selected resource pool; and, transmitting the sidelink signal.

In yet another one of its example aspects, the technology disclosed herein concerns a node of a radio access node. The node comprises processor circuitry and a transmitter. The processor circuitry is configured to generate a first indicator and/or a second indicator configured to enable a pedestrian user equipment (P-UE) which participates in P-UE related V2X communications to determine, based on the first indicator and/or the second indicator: whether to transmit the sidelink signal based on sensing using a selected resource pool; or whether to transmit the sidelink signal based on random selection using the selected resource pool. The transmitter is configured to transmit the first indicator and/or the second indicator over a radio interface to the P-UE.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

FIG. 6B-FIG. 6E are flowcharts showing example basic acts or steps performed by the respective wireless terminals of FIG. 5B-FIG. 5E; FIG. 6F is a flowchart showing example basic acts or steps performed by the wireless terminal of FIG. 5F.

FIG. 6B-1 is a flowchart showing example basic acts or steps performed by an example mode by the wireless terminal of FIG. 5B.

FIG. 6C-1 is a flowchart showing example basic acts or steps performed by an example mode by the wireless terminal of FIG. 5C.

FIG. 7A is a schematic view according to a first example mode of implementation of an example mapping of plural energy threshold values to corresponding plural expressions/values of transmission properties which may be used by the wireless terminal of FIG. 5B to make the selection of the selected radio resource.

FIG. 7B is a schematic view according to a second example mode of implementation of an example mapping of plural energy threshold values to corresponding combinations of plural expressions/values of transmission properties which may be used by the wireless terminal of FIG. 5B to make the selection of the selected radio resource.

FIG. 9 is a schematic view according to an example mode of mapping of differentiated probability functions to corresponding plural expressions/values of transmission properties which may be used by the wireless terminal of FIG. 5D to make the selection of the selected radio resource.

FIG. 10A-FIG. 10C are schematic views of according to differing example modes of implementation of example mappings of switch values to corresponding plural expressions/values of transmission properties which may be used by the wireless terminal of FIG. 5E to make the selection of the selected radio resource.

FIG. 13 is a diagrammatic view showing example elements comprising electronic machinery which may comprise a wireless terminal according to an example embodiment and mode.

DETAILED DESCRIPTION

Figure 2:
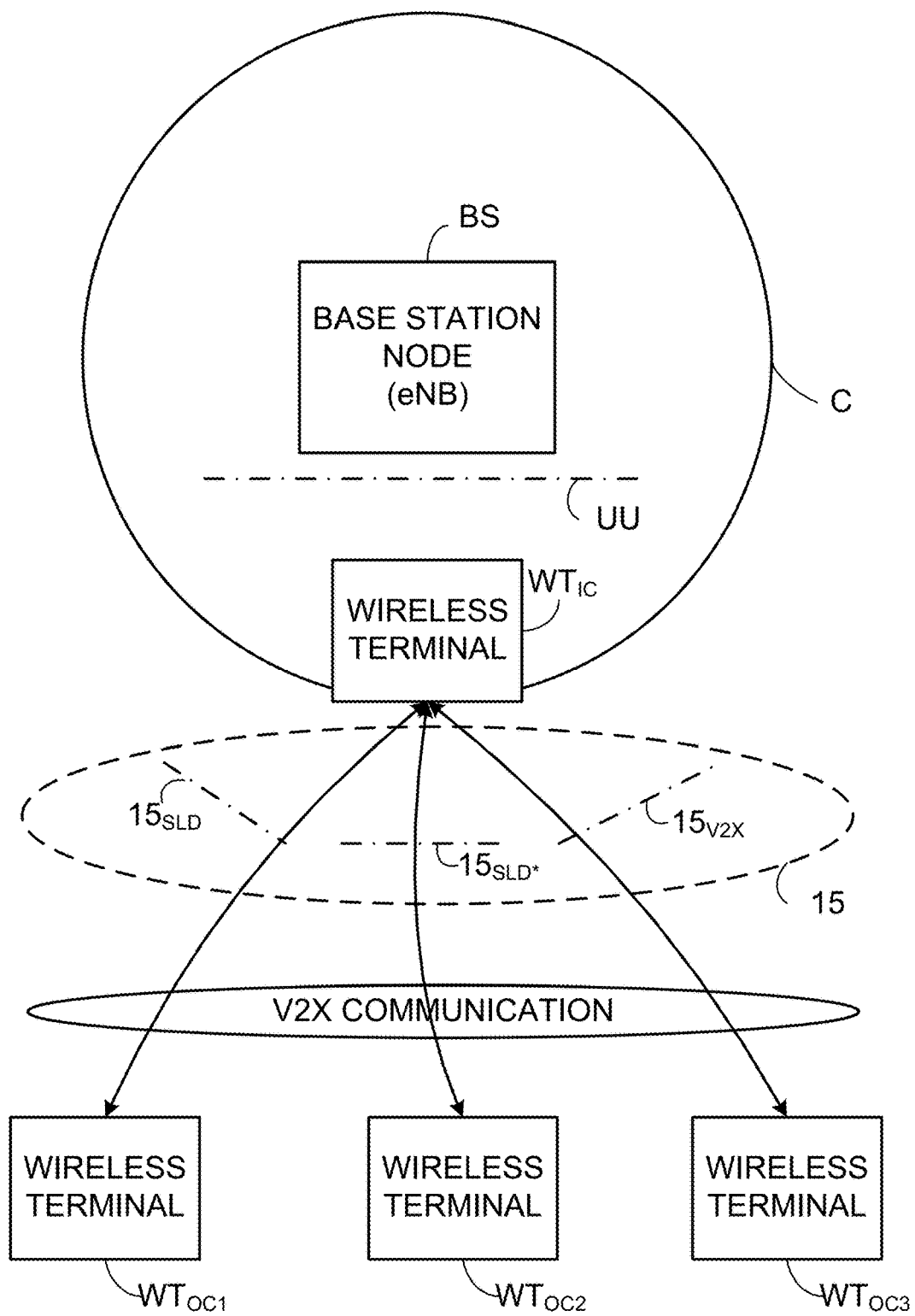
FIG. 2 is a diagrammatic view showing that, in differing implementations, V2X communication may be implemented either in conjunction with sidelink direct (SLD) communication, in conjunction with enhanced SLD, or apart from SLD as a separate V2X communication protocol.

A user equipment (UE) is described. The UE may include a receiver configured to receive a system information which include a flag. The UE may also include a sensor configured to sense a resource pool on the basis of the flag. The UE may further include a transmitter configured to transmit a sidelink signal using the radio resource. The flag may indicate whether or not the UE needs to sense the resource pool before a transmission of the sidelink signal.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", 'sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, 13, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Vehicle (V2X) communication is described in one or more of the following (all of which are incorporated herein by reference in their entirety):

Incorporated herein by reference are the following:
3GPP TS 36.331 V13.0.0 "Evolved Universal Terrestrial Radio Access (E-UTRA); Radio Resource Control (RRC); Protocol specification", including but not limited to § 5.10.3 (Sidelink communication monitoring), § 5.10.4 (Sidelink communication transmission), and § 9.3.2 (pre-configurable parameters).
RP-151109, Feasibility Study on LTE-based V2X Services 3GPP TSG RAN Meeting #68, Malmö, Sweden, Jun. 15-18, 2015.
RP-152293, Support for V2V services based on LTE sidelink, 3GPP TSG RAN Meeting #70, Sitges, Spain, Dec. 7-10, 2015
3GPP TSG RAN WG1 Meeting #84bis, Busan, Korea 11-15 Apr. 2016, Chairman notes.
3GPP TR 22.885 V14.0.0 3rd Generation Partnership Project; Technical Specification Group Services and System Aspects; Study on LTE Support for V2X Services (Release 14).
Chairman's Notes, RAN1 #85, Nanjing, China, May 23-May 27, 2016.
RP-161298, "LTE based V2X Services", Busan, South Korea, Jun. 13-16, 2016.
Chairman's Notes, RAN1 #86, Gothenburg, Sweden, Aug. 22-26, 2016

Vehicle (V2X) communication is a communication that involves a radio connection established between a transmit device and a receive device (e.g., a wireless terminal or UE), which radio communication may or may not transit via a base station node of the network, with at least of one the transmit device and the receive device being mobile, e.g., capable of being moved. Generic V2X encompasses one or more of vehicle to infrastructure (V2I) communication; vehicle to person/pedestrian (V2P) communication; and vehicle to vehicle (V2V) communication. It is understood in the art, and intended herein, that V2X refers to both V2X and X2V; that V2I refers to both V2I and I2V; that V2P refers to both V2P and P2V; and so forth.

Generally, there are three general scenarios which may occur in vehicle (V2X) communication. Those three general vehicle (V2X) communications scenarios are illustrated in FIG. 1. A first vehicle (V2X) communication scenario is an "in coverage" vehicle (V2X) communication scenario, illustrated between WT1 and WT2 of FIG. 1, in which both WT1 and WT2 are within coverage of the cellular radio access network. A second vehicle (V2X) communication scenario is a "partial coverage" scenario, illustrated between WT2 and WT3 of FIG. 1. In the "partial coverage" vehicle (V2X) communication scenario the wireless terminal WT2 is within coverage of the cellular radio access network, but the wireless terminal WT3 is out-of-coverage of the cellular radio access network. A third vehicle (V2X) communication scenario is an "out-of-coverage" scenario, illustrated between wireless terminal WT3 and wireless terminal WT4 of FIG. 1. In the out-of-coverage vehicle (V2X) communication scenario both the wireless terminal WT3 and the wireless terminal WT4 are out-of-coverage of the cellular radio access network.

The three vehicle (V2X) communication scenarios are described with reference to whether or not a participating wireless terminals (e.g., WTs) are "in coverage" or "out-of-coverage" of one or more cellular radio access networks (which may collectively be referred to as a "cellular radio access network"). For sake of simplicity FIG. 1 depicts "coverage" as being with respect to an access node BS such as eNodeB which comprises a cellular radio access network. It should be understood, however, that a wireless terminal may also be in coverage of the cellular radio access network when served by any cell of the cellular radio access network(s). For example, if wireless terminal WT1 and wireless terminal WT2 were served by different cells, when participating in vehicle (V2X) communication the wireless terminal WT1 and wireless terminal WT2 would still be in an in coverage vehicle (V2X) communication scenario.

As used herein and as illustrated in FIG. 2, V2X communication may be implemented in several ways. For illustrative context, FIG. 2 illustrates a base station node BS of a cellular radio access network which serves a cell C. The base station BS may communicate with a wireless terminal $WT_{IC}$ which is in coverage of the cellular radio access network over a radio interface UU. FIG. 2 further shows that wireless terminal $WT_{IC}$ may engage in vehicle (V2X) communication with one or more other wireless terminals which are outside of coverage of the cellular radio access network, particularly wireless terminal $WT_{OC1}$, wireless terminal $WT_{OC2}$, and wireless terminal $WT_{OC3}$. It is assumed that either wireless terminal $WT_{IC}$, or all of wireless terminal $WT_{OC1}$, wireless terminal $WT_{OC2}$, and wireless terminal $WT_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 2 does not mean that a particular wireless terminal has to participate in all three or even two of the example implementations. FIG. 2 simply indicates the expansive meaning of the term vehicle (V2X) communication and that the technology disclosed herein encompasses vehicle (V2X) communication in all of its various existing and potential implementations.

In sidelink direct communications, a scheduling assignment (SA) is used to indicate the data radio resources that may be used to carry data in a sidelink direct transmission, e.g., to a receiving wireless terminal. As such, there may be one or more pools of scheduling assignment (SA) radio resources that are used to carry the scheduling assignment (SA) information, with the scheduling assignment (SA) resources being different than the data radio resources that are described by the scheduling assignment (SA). The data radio resources typically belong to a data pool (of data radio resources).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe S. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of subcarriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

According to RP-151109, Feasibility Study on LTE-based V2X Services 3GPP TSG RAN Meeting #68, Malmö, Sweden, Jun. 15-18, 2016, V2X services should be supported by both LTE Uu interface and sidelink interface. In RP-152293, Support for V2V services based on LTE sidelink, 3GPP TSG RAN Meeting #70, Sitges, Spain, Dec. 7-10, 2015, the LTE sidelink (also known as PC5) is studied as the baseline for V2X service. However, as mentioned above, there are numerous differences between V2X and D2D, such as higher V2X UE density and much higher V2X UE velocity.

Regarding the topic of resource pool design, 3GPP TSG RAN WG1 Meeting #84bis, Busan, Korea 11-15 Apr. 2016, Chairman notes (herein, "Meeting #84bis Chairman notes") include the following concepts:

A data pool is always associated with an SA pool.
    A resource block (RB) of a scheduling assignment (SA) pool in a transmission time interval (TTI) cannot be included in the associated data pool.
    A resource block (RB) of a scheduling assignment (SA) pool in a transmission time interval (TTI) cannot be included another SA pool (if another SA pool exists).
    At least a resource block (RB) of a data pool in a transmission time interval (TTI) can be included in another data pool (if another data pool exists).
    A resource block (RB) of an scheduling assignment (SA) pool in a transmission time interval (TTI) cannot be included an un-associated data pool (if another un-associated data pool exists)

The Meeting #84bis Chairman notes thus prescribe 1) no overlap between SA pools and data pools, no matter whether there are linkages between them; (2) no overlap among SA pools; and, (3) possible overlap among data pools. In an extreme case of (3), there may be only one data pool shared by multiple SA pools.

Therefore, with the Meeting #84bis Chairman notes there arises a new problem of how to handle overlapped resources (for data pool) during resource selection. This problem is new since, in the legacy sidelink communications, no data pools overlap with each other.

Figure 3:
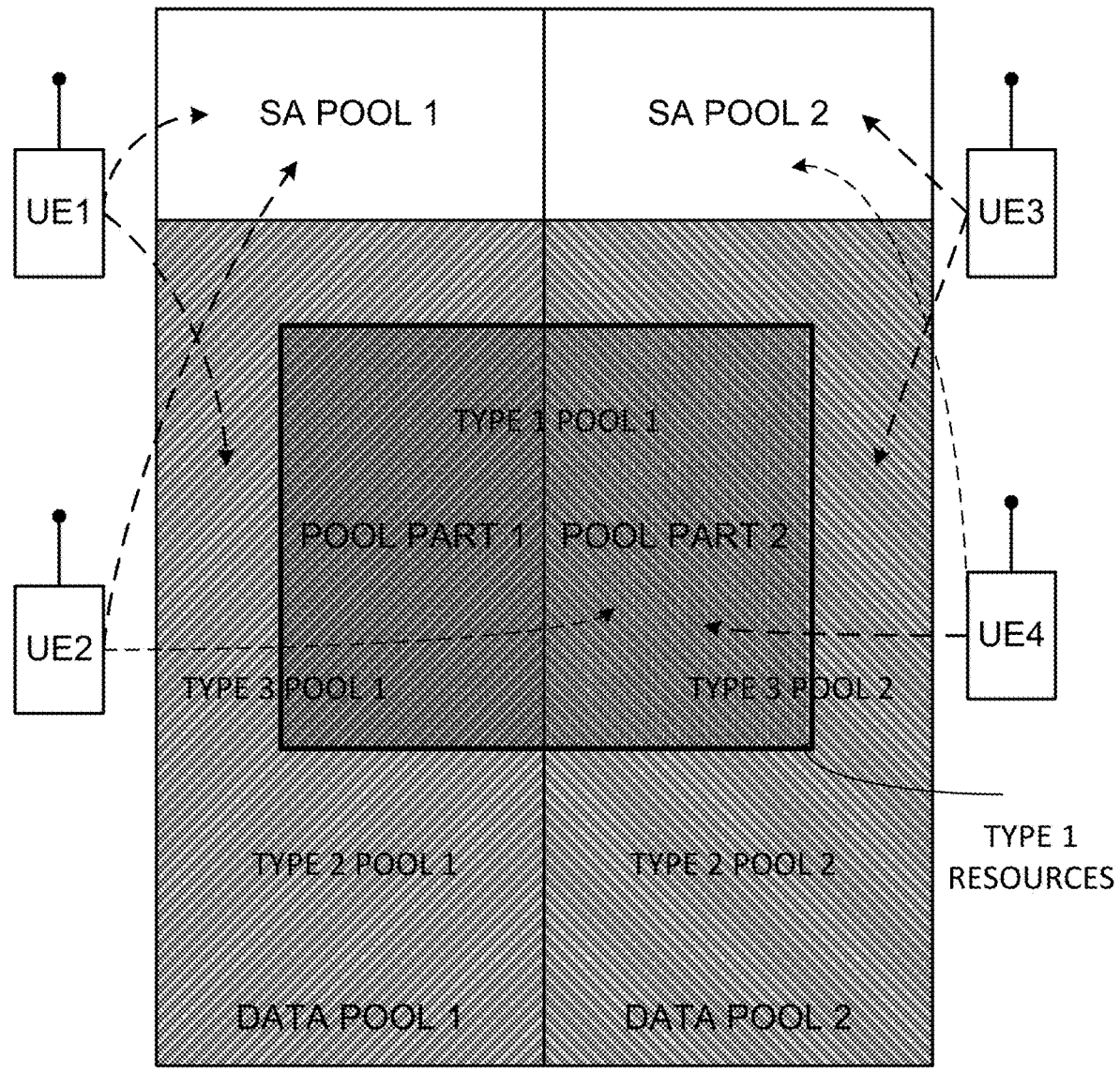
FIG. 3 is a diagrammatic view of illustrating a problem of selecting resources when there are both overlapping data radio resource pools and non-overlapping data radio resource pools.

FIG. 3 illustrates the problem of selecting resources when there are both overlapping data radio resource pools and non-overlapping data radio resource pools. As shown in FIG. 3, UE1 and UE3 have non-overlapped scheduling assignment (SA) and non-overlapping data pools; while UE2 and UE4 have overlapped data pool although they have non-overlapped SA pools.

For convenience, the overlapped resources such as those of FIG. 3 are herein referred to as "Type 1 Resources", which correspond to the resources "at least an RB of a data pool in a TTI can be included in another data pool (if exists)" as mentioned in the Meeting #84bis Chairman notes. The non-overlapped resources in each data pool of FIG. 3 are referred to herein as "Type 2 Resources". Of course, the resources can also be provided with other names (such as, e.g., reversing the nomenclature described above such that the overlapped resources as "Type 2 Resources" and the non-overlapped resources as "Type 1 Resources").

The following statements describe the resources and pools of FIG. 3:
data pool 1 (Type 3 pool 1)=pool part 1∪pool part 3
data pool 2 (Type 3 pool 2)=pool part 2∪pool part 4
Type 2 pool 1=pool part 3
Type 2 pool 2=pool part 4
Type 1 pool 1=pool part 1∪pool part 2
    Thus, as shown in FIG. 3 and used herein:
      a Type 3 pool represents a legacy sidelink data pool, which includes overlapped resources and non-overlapped resources (if exist).
      a Type 2 pool represents the non-overlapped resources within each legacy data pool excluding the overlapped resources with other legacy data pool(s).
      a Type 1 pool represents the overlapped resources within each legacy data pool.

As the resource selection within each pool is random, UE1 and UE3 can guarantee no interference with each other no matter how they select resource within their data pool. However, UE2 and UE4 may interfere with each other because they share the same data resources. Furthermore, if the UE, e.g., UE2, randomly selects resources within Type 1 pool and the resource selected is within the data pool 2, it may also interfere with UE3. However, from a system performance point of view, scheduling UE2 and UE4 in the same pool has better efficiency than scheduling them in separate pools. Therefore, how to select between Type 1 resources and Type 2 resources, or between Type 1 pool and Type 2 pool, is a new problem arising in the context of V2X communications.

In V2X communications, the same resource can be reused by UEs far enough from each other (interference generated by using the same resource is so weak that it cannot interfere with the other UEs' communication). However, since sidelink is half duplex communication, when the UE is transmitting, it cannot detect whether there is interference from other UEs. When the UE transmitting, with resources which have no collision with nearby UEs, moves to other locations, the resources it uses may still collide with the UEs in the new locations, especially if these resources are in the same resource pool, or in the same Type 1 resource pool.

As mentioned above, a scheduling assignment (SA) carries information which specifies the data resources that may be used by the UE). Scheduling assignment (SA) decoding (SAD) and energy sensing (ES) may be used for collision avoidance. However, due to half duplex of V2V and the essence that V2V UE cannot decode all UEs' scheduling assignments (SA), the resource selection collision problem cannot be totally avoided.

Figure 4A:
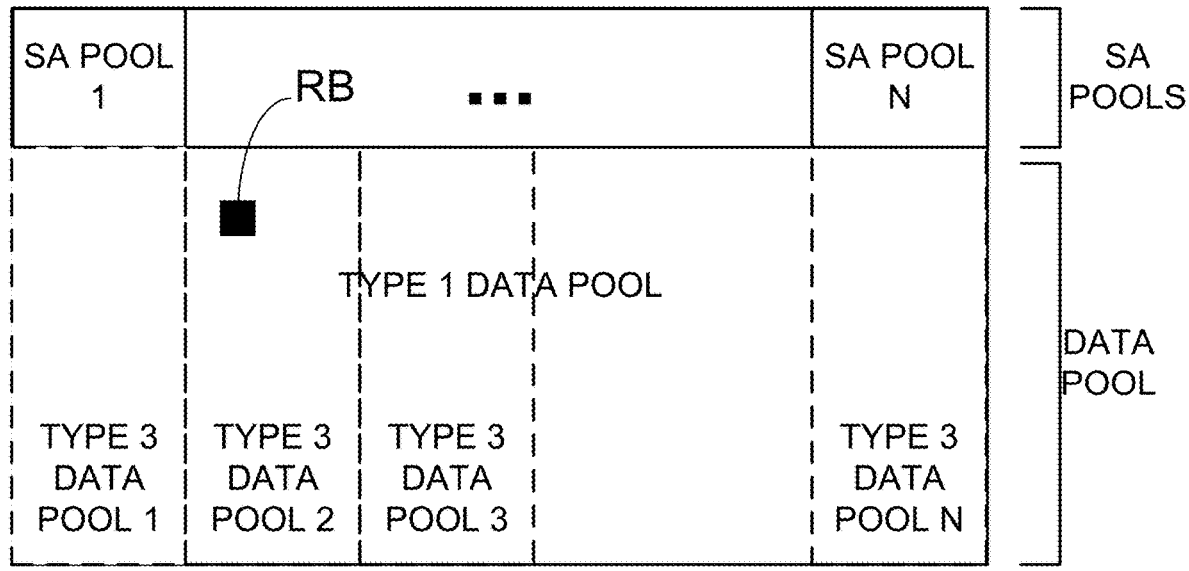
FIG. 4A and FIG. 4B are diagrammatic views of example radio resource pool(s) structures, FIG. 4A illustrating a common Type 1 data pool shared by wireless terminals and FIG. 4B illustrating (as a non-limiting example) multiple Type 1 pools
Figure 4B:
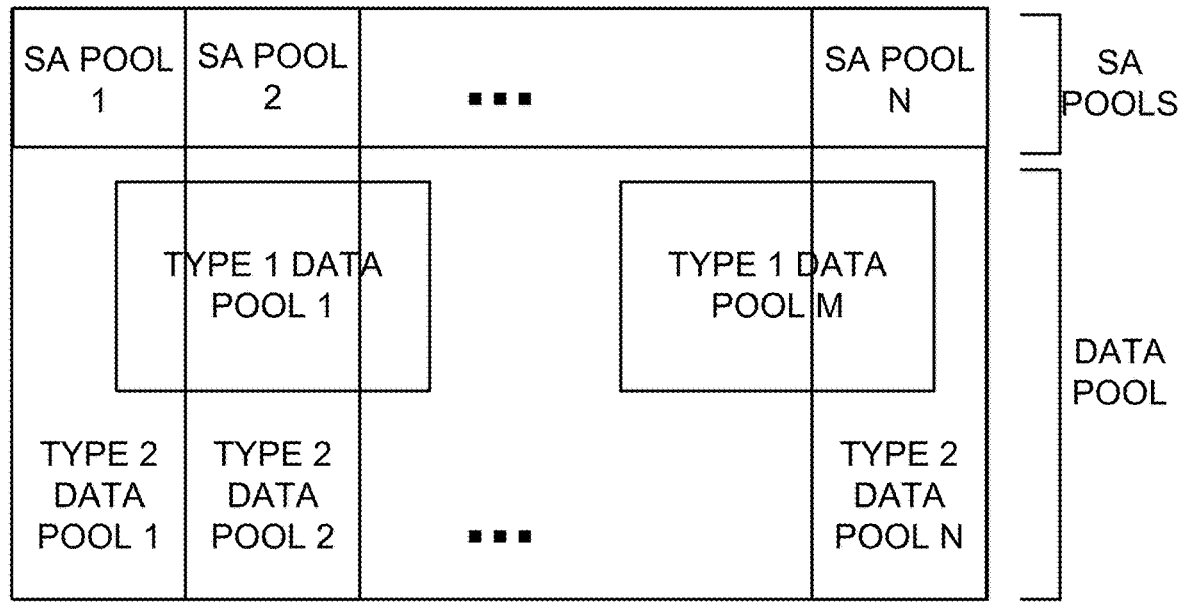

The Type 3 multiple resource pool design and resource selection have already been described in U.S. Patent Provisional Application 62/319,065 and U.S. patent application Ser. No. 15/477,299, both entitled "RESOURCE SELECTION FOR VEHICLE (V2X) COMMUNICATIONS", and incorporated herein by reference in their entirety. The technology disclosed herein concerns, e.g., selection between the Type 1 resources and Type 2 resources. As used herein, Type 1 resources may be just one common pool shared by all UEs (as illustrated in FIG. 4A), or multiple Type 1 data pools from multiple Type 3 pools (as illustrated in FIG. 4B). FIG. 4A and FIG. 4B are based on the facts that N≥1 and N>M and (for FIG. 4B) Type 1 data pools can exist among adjacent data pools (if there are multiple data pools). It should be noted that Type 1 data pools do not mean they are only shared by two resource pools, as there could be multiple Type 3 data pools forming one Type 1 data pool, as Type 1 data pool 1 depicted in FIG. 4B.

It should also be understood that pool segmentation can be based on some property or criteria, such as each resource pool being associated with a priority, for example. As described in U.S. Patent Provisional Application 62/319,065 and U.S. patent application Ser. No. 15/477,299, both entitled "RESOURCE SELECTION FOR VEHICLE (V2X) COMMUNICATIONS", and incorporated herein by reference, pool segmentation can be associated with a criteria or property other than priority, such as service type, direction, and velocity, for example.

In Type 1 data pools, though the system performance improves, all UEs have to share the same pool and randomly select resources within the same pool, risking high probability of interference with each other, especially in the area where there is high density of UEs. Accordingly, the technology disclosed herein provides solutions for selection of the selected radio resource from an overlapping data resource pool based on a transmission property of the V2X communication. As used herein, an "overlapping pool" or "overlapping data resource pool" is a pool comprising data radio resources that may populate or comprise (e.g., be shared among) other data radio resource pool(s), whereas a "non-overlapping pool" is a pool that consists of data radio resources that are associated or belong only to the one pool, i.e., the non-overlapping pool. Thus, it can be seen in the scenario of FIG. 4A, sole Type 1 Data Pool is constructed so that all of its resources, such as resource block (RB), belong to or are shared among other data pools. For example, resource block (RB) of the sole Type 1 Data Pool of FIG. 4A is essentially shared among plural Type 3 data pools, e.g., shared among each of Type 3 Data Pool 1 through and including Type 3 Data Pool N. In other words, by virtue of belonging to the "overlapping pool" of Type 1, all resource blocks of the overlapping pool are shared among plural other pools that permit such sharing. FIG. 4B, on the other hand, shows plural such overlapping data radio resource pools, with each of Type 1 Data Pool 1 and Type 1 Data Pool M having membership as above described for FIG. 4A, each resource block of each Type 1 Data Pool being shared among other pools.

Thus, the technology disclosed herein encompasses selection of a data radio resource from an overlapping radio resource pool. The technology disclosed herein does not seek to control interference among transmissions of the same type from wireless terminals, but to control interference among different types of transmissions from the wireless terminals. As used herein "transmissions of the same type from a wireless terminal" means that the transmissions have a same property with respect to transmission. Non-limiting examples of transmission property include the following: priority of the V2X communication; direction of travel of the wireless terminal; velocity of the wireless terminal; type of service of the V2X communication; density of wireless terminals in a particular area; and, load on radio resources in a particular area. These and other examples are understood from U.S. Patent Provisional Application 62/319,065 and U.S. patent application Ser. No. 15/477,299, both entitled "RESOURCE SELECTION FOR VEHICLE (V2X) COMMUNICATIONS", incorporated herein by reference in their entirety.

FIG. 5 shows various example, representative, non-limiting components and functionalities herein pertinent of a generic wireless terminal 20 configured to make a selection of a data radio resource from an overlapping radio resource pool for a vehicle (V2X) communication. The wireless terminal 20 comprises transceiver circuitry 22, which in turn comprises transmitter circuitry 24 and receiver circuitry 26. The transceiver circuitry 22 includes antenna(e) for the wireless terminal 20. Transmitter circuitry 24 includes, e.g., amplifier(s), modulation circuitry and other conventional transmission equipment. Receiver circuitry 26 comprises, e.g., amplifiers, demodulation circuitry, and other conventional receiver equipment. The transceiver circuitry 22 is configured to use resources allocated for V2X communication, whether those resources be shared with sidelink direct (SLD) communications or separate and distinct for V2X communication as previously described. The transceiver circuitry 22 may also comprise, or be connected to, a sensor configured to sense a resource pool. Such sensor may also comprise one or more processors described herein.

The wireless terminal 20 further comprises processor circuitry, also herein known more simply as processor 30. While processor 30 may have responsibility for operation of many aspects of wireless terminal 20 not specifically described herein, in one of its aspects processor 30 serves as a V2X controller 32 for controlling aspects of vehicle (V2X) communication. As further illustrated in FIG. 5, the V2X controller 32 in turn comprises frame handler 33, resource selection controller 35, resource/pool structure 36 (which includes overlapping resource pool 37), and frame generator 38.

In addition to the processor circuitry 30, wireless terminal 20 also comprises memory 40 (e.g., memory circuitry) which may store an operating system and various application programs, such as vehicle (V2X) communication applications 44 (including V2I application 46, V2V (vehicle-to-vehicle) application 47 and V2P (vehicle-to-pedestrian) application 48, discussed above. The memory 40 may be any suitable type of memory, e.g., random access memory (RAM), read only memory (ROM), cache memory, processor register memory, or any combination of one or more memory types. The applications such as V2X applications 44 comprise instructions executable by processor circuitry 30 and are stored in non-transient portions of memory 40. At least some aspects of memory 40 may also be considered as part of V2X controller 32, and as such may host some or all of resource/pool structure 36.

The wireless terminal 20 further comprises user interface (s) 50. The user interfaces 50 may comprise one or more suitable input/output devices which are operable by a user. Some of all of the user interfaces 50 may be realized by a touch sensitive screen. The user interface(s) 50 may also comprise a keyboard, audio input and output, and other user I/O devices. Only a portion of the user interfaces 50 is depicted in FIG. 5, it being understood that the user interfaces 50 may be provided on a cover or case of wireless terminal 50 and thus may visibly obscure the underlying other components shown in FIG. 5.

In the example FIG. 5, the resource/pool structure 36 stores information regarding data radio resources, including an overlapping radio resource, e.g., overlapping resource pool 37. Thus the plural data radio resource pool types include data radio resource pools of Type 1. As mentioned above, non-limiting examples of overlapping resource pools are illustrated in both FIG. 4A and FIG. 4B. Overlapping pool structures other than the specific pools of and FIG. 4A FIG. 4B are encompassed hereby and as such may be described by the information in overlapping resource pools 37.

Figure 5A:
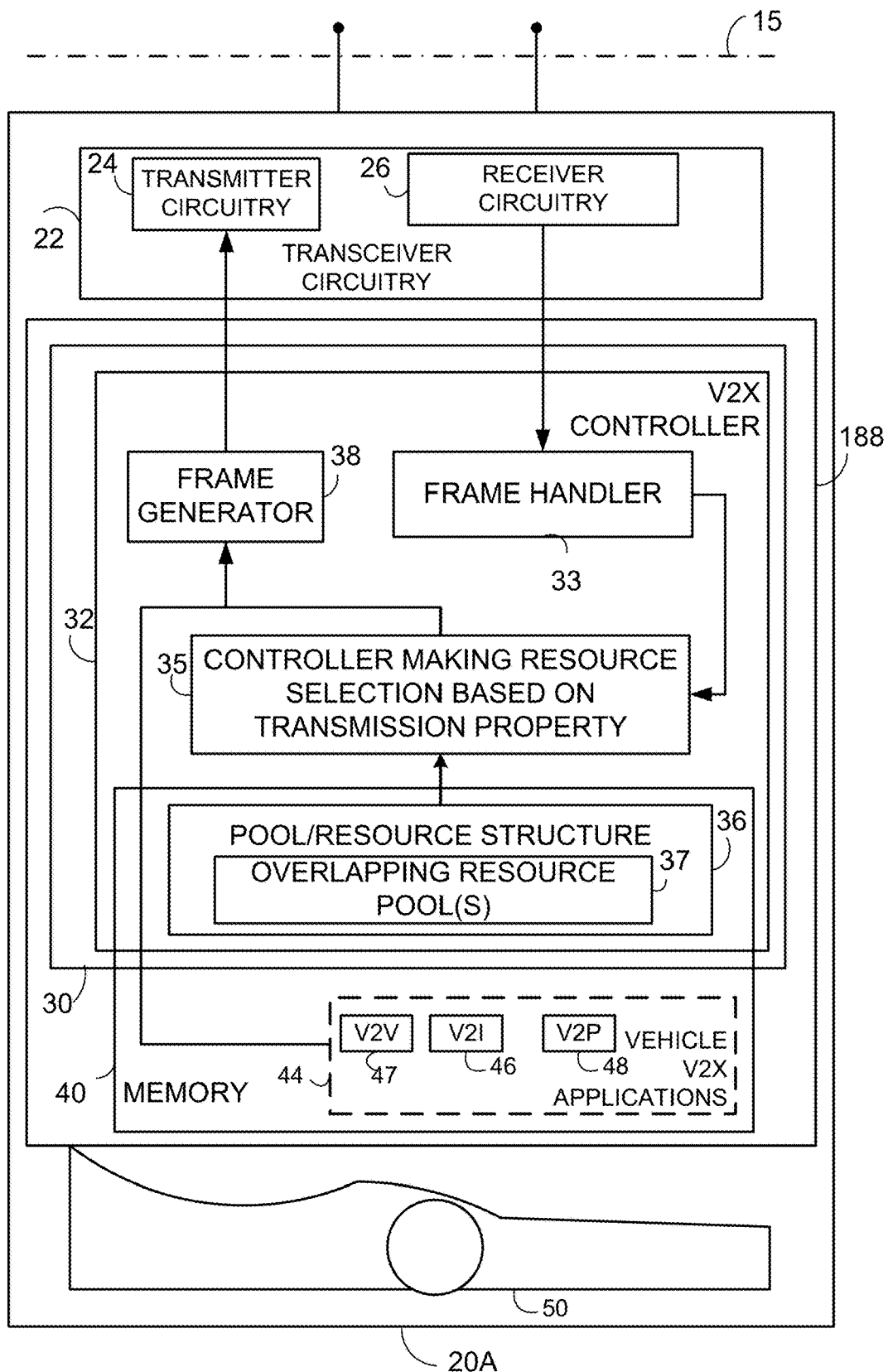
FIG. 5A is a schematic view of an example embodiment of a generic wireless terminal configured to make a selection of a selected radio resource from an overlapping data resource pool based on a transmission property of the V2X communication.

The resource selection controller 35 of the generic wireless terminal 20 of FIG. 5A executes a resource selection procedure in for making a selection of the selected radio resource from the overlapping data resource pool based on a transmission property of the V2X communication to be transmitted by the wireless terminal 20. In an example implementation, the V2X communication is prepared in frame generator 38, which is informed of the selected radio resource to carry the V2X communication and which receives the data for inclusion in the data radio resource from whichever of the V2X applications 44 is involved in the V2X communication.

Figure 6A:
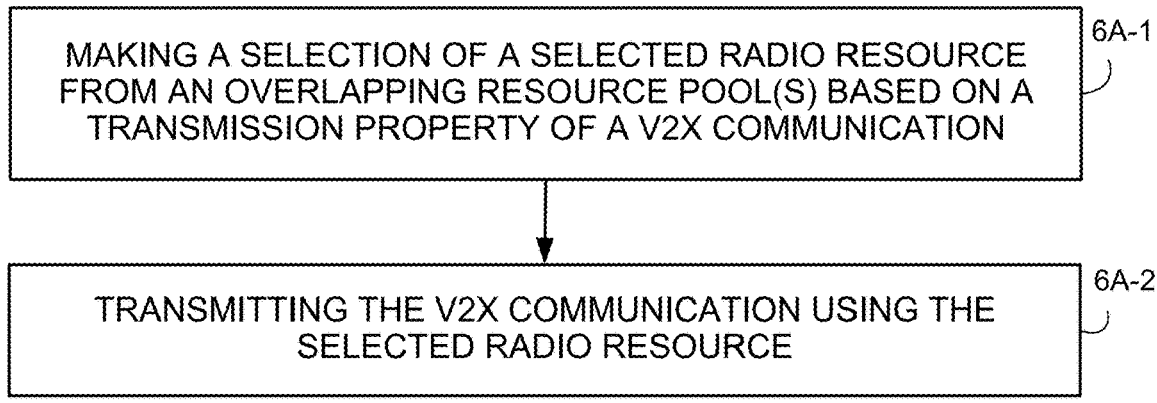
FIG. 6A is a flowchart showing example basic acts or steps performed by the generic wireless terminal of FIG. 5A in a resource selection procedure for making a selection of a selected data radio resource from an overlapping data resource pools based on a transmission property of the V2X communication

FIG. 6A illustrates basic, example acts or steps involved in a method of operating the wireless terminal 20 of FIG. 5A, including acts comprising the resource selection procedure in particular. Act 6A-1 comprises making a selection of the selected radio resource from the overlapping data resource pool based on a transmission property of the V2X communication. Act 6A-2 comprises transmitting the V2X communication (over a radio interface) using the selected radio resource. After the resource is selected by resource selection controller 35, the V2X communication is prepared by frame generator 38, which is informed of the selected radio resource to carry the V2X communication and which receives the data for inclusion in the data radio resource from whichever of the V2X applications 44 is involved in the V2X communication.

A generic embodiment has been described with respect to wireless terminal 20A of FIG. 5A and the acts of FIG. 6A. Other non-limiting example embodiments which make the resource selection using criteria other than transmission property, or which include special techniques for using the transmission properties, are described in conjunction with the wireless terminals 20B-20E of FIG. 5B-FIG. 5E, respectively, as well as the respective embodiment acts of FIG. 6B-FIG. 6E.

First Example Embodiment

In V2X communications a UE should detect whether the resource that it intends to use has been occupied, or is being occupied, or will certainly be occupied by some other wireless terminal(s). In this regard, the wireless terminal has to sense the energy level of resources before transmission, using what has been referred to as "energy sensing".

Figure 5B:
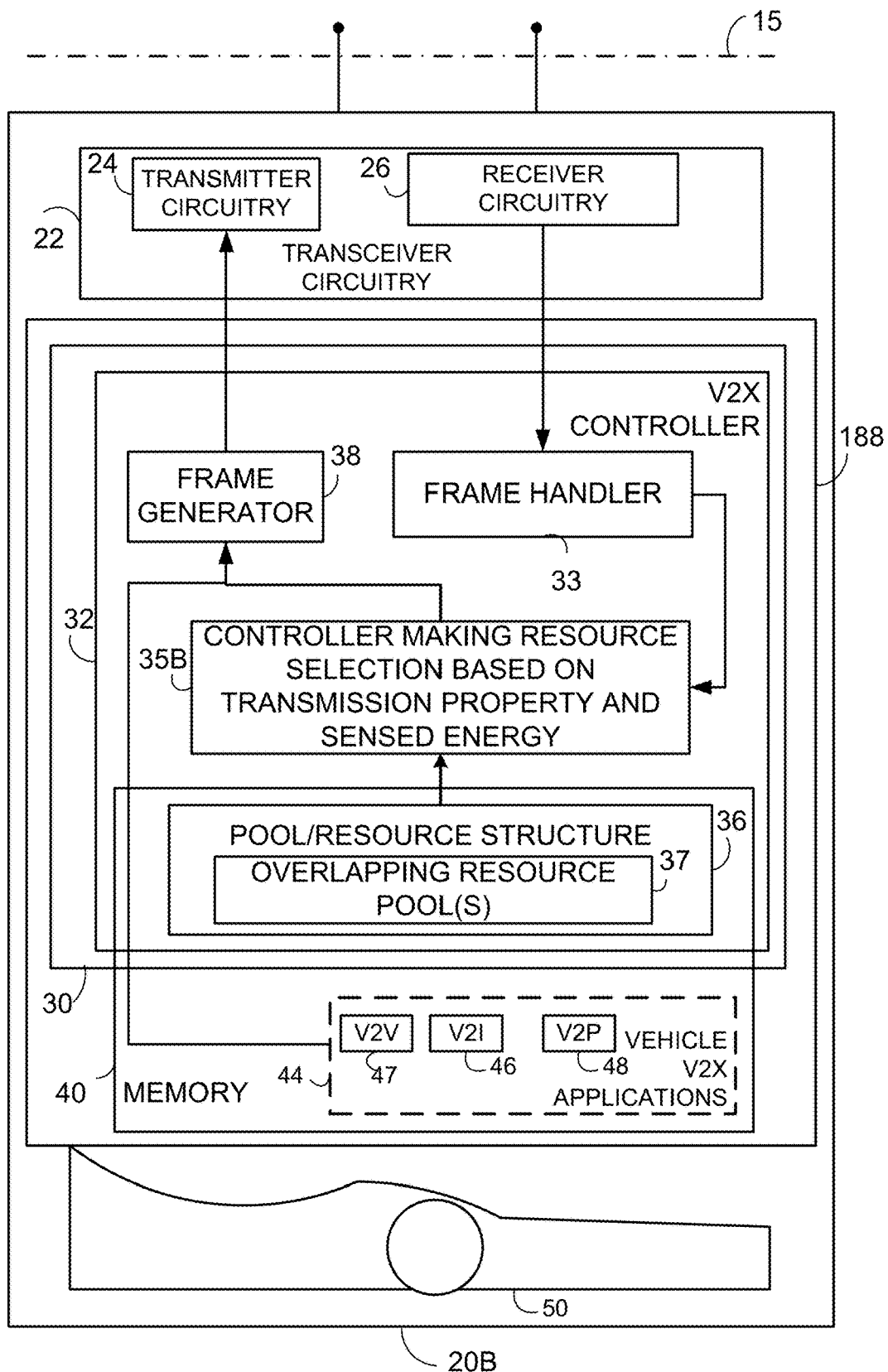
FIG. 5B-FIG. 5E are schematic views of other example embodiments of wireless terminals configured to make a selection of a selected radio resource from an overlapping data resource pools based on a transmission property of the V2X communication and other criteria.
Figure 6B:
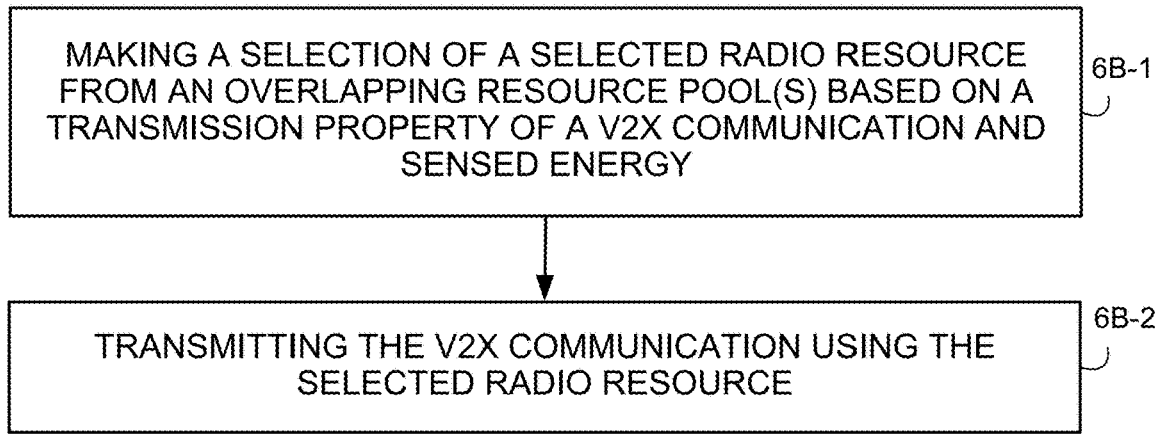

In a first example more specific embodiment the resource selection controller 35B of FIG. 5B is configured to make the selection of the selected radio resource in conjunction with sensed energy of the candidate radio resource. FIG. 6B depicts by act 6B-1 the act of making the selection of a candidate radio resource as the selected radio resource in conjunction with sensed energy of the candidate radio resource.

In an example implementation of the first more specific embodiment, different energy thresholds are configured for different types of transmissions from wireless terminals for differentiation purposes. As understood from above, a V2X communication may have a property such as priority, and different V2X communications may have different values or expressions. So in this first example more specific embodiment, and using priority as an example of transmission property, each different priority value/expression (or range of priority values/expressions) is assigned a corresponding energy threshold. For example, a highest priority communication may have an energy threshold of $X_1$ units; a next highest priority communication may have an energy threshold of $X_2$ units; and so on (with $X_1 < X_2$). The resource selection controller 35B makes the selection of the candidate radio resource as the selected radio resource by comparing the sensed energy of the candidate radio resource with an energy threshold suitable for an expression/value of the transmission property. As used herein, the energy threshold be reflected by an expression or value. Typically "value" is associated with a numerical quantity. As used herein, both "value" and "expression" encompass more than numerical quantity, but can also refer to logic states (e.g., "ON"/ "OFF") or certain identifiers ("V2X", "V2I", "V2P", etc.). Moreover the terms "value" and "expression may be used interchangeably herein as both having the expansive meaning just explained.

FIG. 6B-1 shows example representative acts of steps which may be performed by resource selection controller 35B to implement the foregoing mode. Act 6B-1-1 comprises the resource selection controller 35B fetching or otherwise acquiring the pertinent energy threshold value(s). The pertinent energy threshold value(s) may be configured at the wireless terminal 20B, e.g., in memory 40, or obtained from a message (e.g., broadcast or RRC signaling) from another node of a radio access network (e.g., a base station or another wireless terminal).

Act 6B-1-2 comprises the resource selection controller 35B making an initial selection of a candidate radio resource and obtaining the sensed energy of the candidate radio resource. As act 6B-1-3 the resource selection controller 35B checks whether the sensed energy of the candidate radio resource is below (lower than) an energy threshold suitable for an expression/value of the transmission property associated the V2X communication that wireless terminal 20B intends to transmit. Act 6B-1-3 assumes that the candidate resource is available after scheduling assignment (SA) decoding. If the determination of act 6B-1-3 is affirmative, then as act 6B-1-4 the candidate radio resource is selected as the selected radio resource and as act 6B-2 the V2X communication is transmitted using the radio resource selected at act 6B-1-4. If the determination of act 6B-1-3 is negative, as act 6B-1-5 the resource selection controller 35B either selects another candidate radio resource or waits for the next scheduling period, and thereafter continues execution by looping back to act 6B-1-1 to test the next candidate radio resource.

From the foregoing it is understood that, at least in an example implementation, different energy thresholds may be configured for different types of wireless terminals' transmissions for differentiation purpose. For example, a higher priority wireless terminal can be configured with lower energy transmission threshold; while a lower priority wireless terminal can be configured with higher energy transmission threshold. Then, supposing two wireless terminals with different priority of transmission select the same resources, after proper setting of their energy transmission thresholds, the higher priority transmission may use the resources for transmission but the lower priority transmission may, as a result, not use the same resources for transmission, so as to avoid interference to the higher priority transmission.

In a further more specific implementation the resource selection controller 35B may uses a mapping of plural energy threshold values to corresponding plural expressions/ values of transmission properties to make the selection of the selected radio resource. Such a mapping may exist, for example, in an information element (IE) which herein bears the name "Tx_EnergyThreshold", but could have other names as well.

A first example format of the Tx_EnergyThreshold IE 52A is shown in FIG. 7A. FIG. 7A shows that Tx_EnergyThreshold IE 52A comprises a pairing of transmission property expression (TPE) with a corresponding energy threshold. For example, transmission property expression $TPE_1$ is paired with energy threshold $X_1$ dBM; transmission property expression $TPE_2$ is paired with energy threshold X2 dBM; and so forth. Assuming that transmission property expression $TPE_1$ has a higher rank or significance than transmission property expression $TPE_2$, then energy threshold $X_1$ will be less than energy threshold $X_2$. Indeed the energy thresholds $X_i$ may be used to establishing a ranking or preference among the transmission property expressions $TPE_i$.

A second example format of the Tx_EnergyThreshold IE 52B is shown in FIG. 7B. FIG. 7B shows that Tx_EnergyThreshold IE 52A comprises a pairing of a combination of transmission property expressions (TPE1/TPE2) with a corresponding energy threshold. For example, a combination of transmission property expression $TPE1_1$ and $TPE2_1$ is paired with energy threshold $X_1$; a combination of transmission property expression $TPE1_1$ and $TPE2_2$ is paired with energy threshold $X_2$; a combination of transmission property expression $TPE1_2$ and $TPE2_2$ is paired with energy threshold $X_3$; and so forth. As an illustration, of Tx_EnergyThreshold IE 52B, $TPE1_1$ may be an expression of the highest priority when the first property is priority, and $TPE2_1$ maybe an expression of a north direction when the second property is travel direction.

The Tx_EnergyThreshold IE 52A and Tx_EnergyThreshold IE 52B may be configured at the wireless terminal 20B, e.g., in memory 40, or obtained from a message (e.g., broadcast or RRC signaling) from another node of a radio access network (e.g., a base station or another wireless terminal). If the wireless terminal 20B receives Tx_EnergyThreshold IE 52A or Tx_EnergyThreshold IE 52B, wireless terminal 20B configures lower layers to transmit the sidelink data, if the resources indicated by decoding the scheduling assignments (SAs) of other wireless terminals are still available to the UE, and the resources whose sensed energy level is lower than the corresponding threshold indicated by the Tx_EnergyThreshold IE 52A or Tx_EnergyThreshold IE 52B.

Whether in IE form or not, the energy threshold for the first example more specific embodiment may be expressed in any appropriate unit of energy or power, such as dBm, or mWatt, or Joule, or Jou, for example. Moreover, as understood from the convention adopted above, if "priority 1" has higher priority than "priority 2", then $X_1$ dBm is lower than $X_2$ dBm. Moreover, if one type of wireless terminal's transmission is set as infinity high, it actually means this type of transmission never has chance to obtain resources, or in other ords, that type of transmission is actually switched off. So in some instances the upper bound of the "Tx_EnergyThreshold" could be infinity.

Second Example Embodiment

Before transmission, a wireless terminal UE has to detect whether it has resources available for transmission. Such detection may include both (1) energy sensing of the radio resources and (2) decoding of scheduling assignments (SAs) from other wireless terminals. regarding (2), the wireless terminal should decode other scheduling assignments (SAs) to check whether the resources are being, or will certainly be used by other wireless terminals. If the detecting wireless terminal finds the resources are being used by other wireless terminals, in accordance with this second example more specific embodiment the wireless terminal may pre-empt these resources if deemed necessary. If the SA indicates the resources will be used by some other wireless terminal, the detecting wireless terminal can also decide whether it will use, or will not use, the resources. As used herein, "deemed necessary" entails that the transmission type or transmission property permits this transmission to pre-empt another transmission. For example, if the transmission is a higher priority transmission; or if the transmission is for a freeway, for example, then a V2V transmission should be guaranteed instead of a V2P transmission.

Figure 5C:
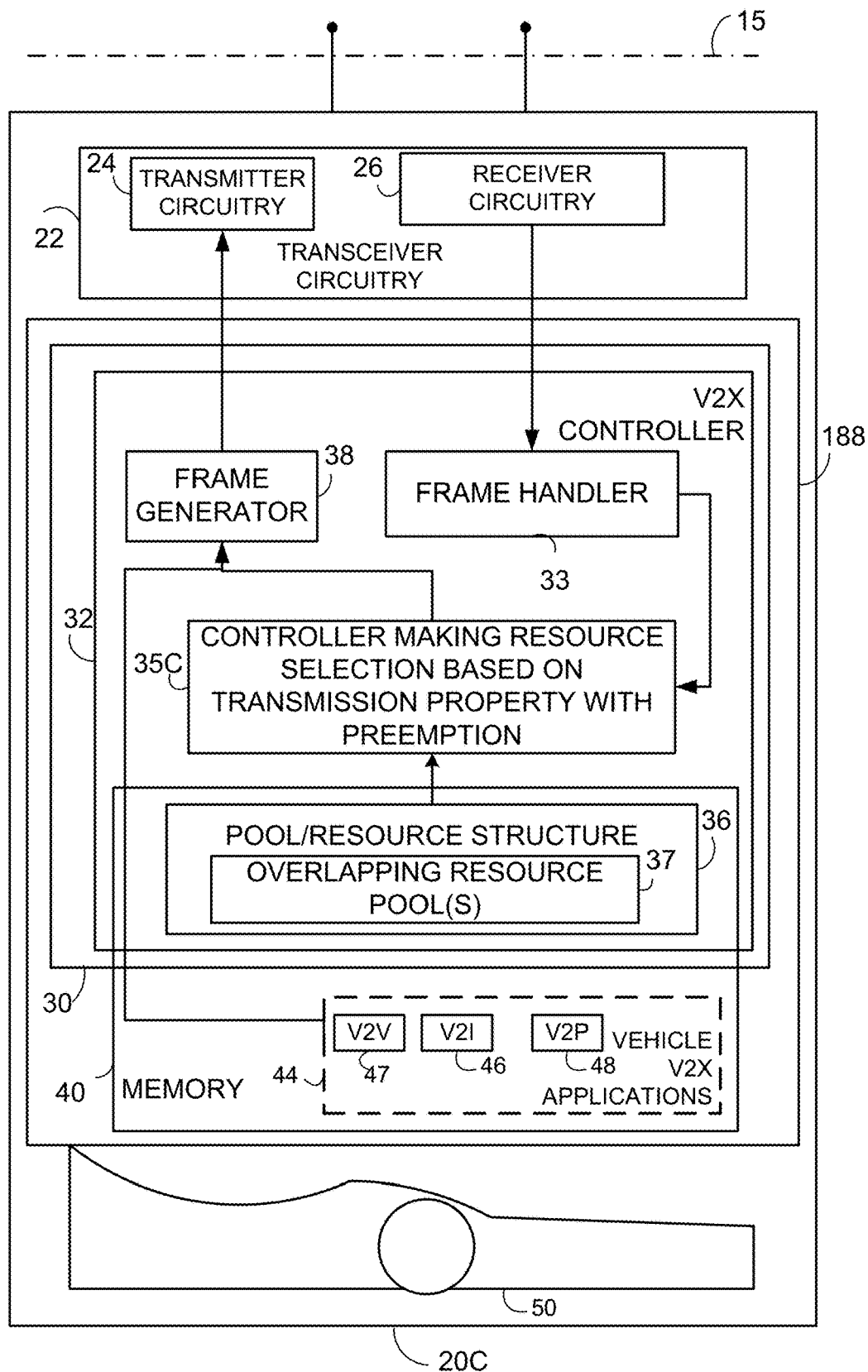
Figure 6C:
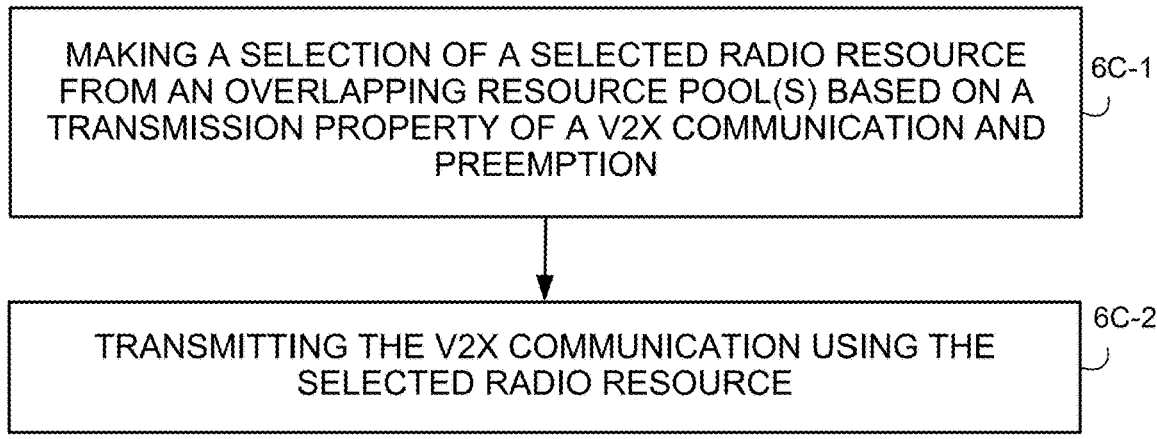
Figures 1, 6B, 7A, 7B:
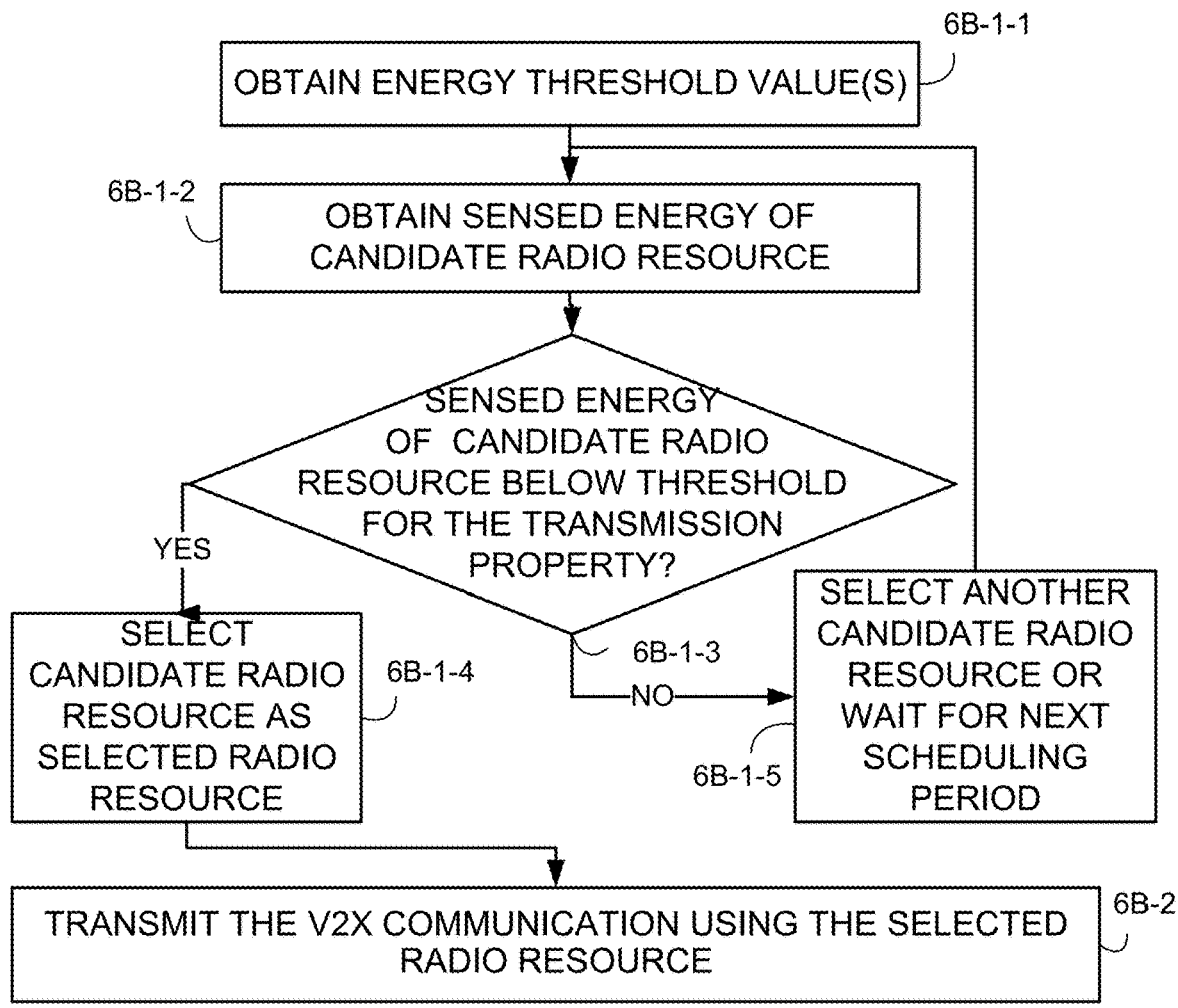
Figures 1, 6C:
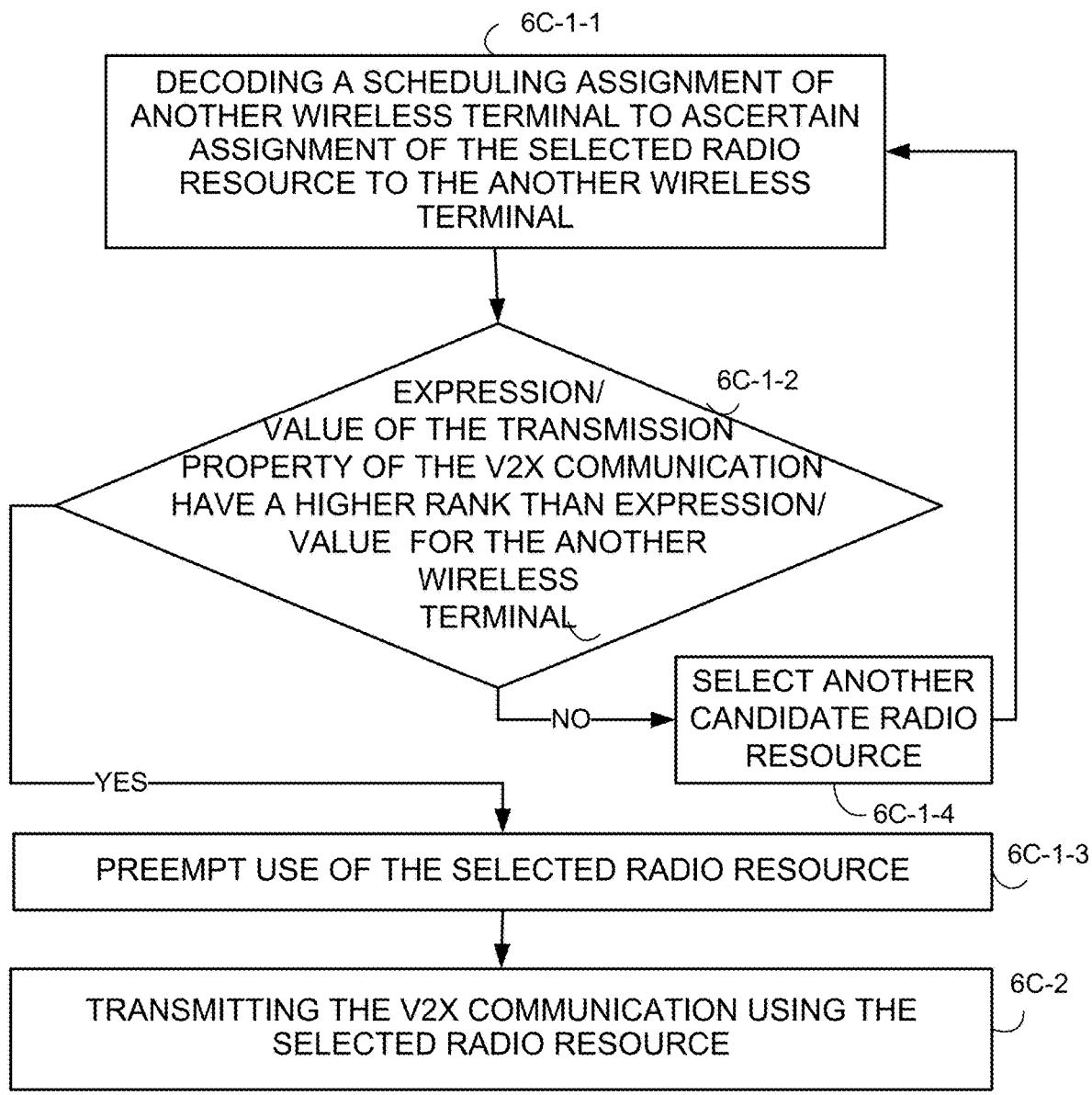

In the second example more specific embodiment the resource selection controller 35C of FIG. 5C is configured to make the selection of the selected radio resource and to preempt based on transmission property of the V2X communication. FIG. 6C depicts by act 6C-1 the act of making the selection of a radio resource as the selected radio resource and preempting the selected resource if necessary.

FIG. 6C-1 shows in more detail a yet more specific implementation of a procedure performed by resource selection controller 35C of wireless terminal 20C. Act 6C-1-1 comprises the resource selection controller 35B decoding a scheduling assignment of another wireless terminal to ascertain assignment of the selected radio resource to the other wireless terminal. Act 6C-1-2 comprises determining if an expression/value of the transmission property of the V2X communication for the wireless terminal has a higher rank than an expression/value of a V2X communication for the other wireless terminal for which the SA was decoded. If the determination of act 6C-1-2 is affirmative, as act 6C-1-3 the resource selection controller 35C permits preemption of the radio resource as thus selection of the radio resource as the selected radio resource. Act 6C-2 then comprises transmitting the V2X communication using the selected radio resource. If the determination of act 6C-1-2 is negative, act 6C-1-4 is executed to obtain another candidate radio resource, after which resource selection controller 35C loops back to act 6C-1-1 to decode the newer candidate radio resource.

To implement this third more specific example embodiment the resource selection controller 35C must know the transmission property associated with the V2X communication of the other wireless terminal.

Figure 8:
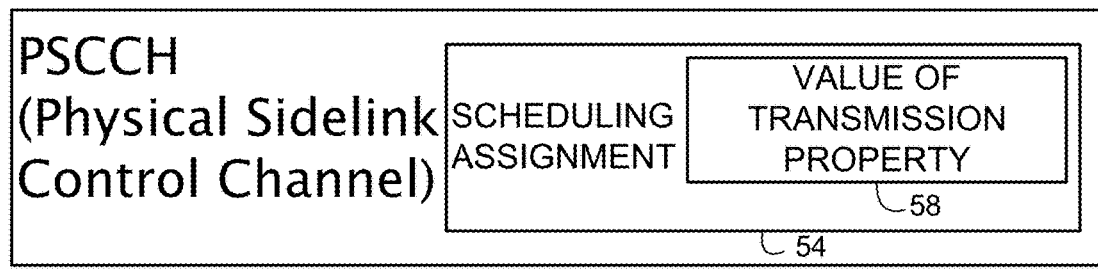
FIG. 8 is a schematic view showing inclusion of an indication of a transmission property value in a scheduling assignment (SA).

That is, the wireless terminal must know the type information, e.g., the priority information or some other type(s) of information which is carried by SA. When the wireless terminal decodes other wireless terminal's SA, the wireless terminal then also knows who competes the resources with itself, so as to make decision. The type or transmission property information may be carried, for example, in the scheduling assignment (SA) itself. In this regard, FIG. 8 shows an example scheduling assignment 54 which is included in a Physical Sidelink Control Channel (PSCCH) 56. FIG. 8 further illustrates that the scheduling assignment 54 may include an information element or field 58 which bears an indication of transmission type (e.g., transmission property).

In order to realize this method, the type information, e.g., the priority information or some other type(s) of information is carried by SA. When the UE decodes other UE's SA, it also knows who competes the resources with itself, so as to make decision.

Third Example Embodiment

In conventional device-to-device (D2D)/SLD communications and conventional V2X, within a given resource pool the wireless terminal randomly selects resources for transmission. The current specification TS 36.321 prescribes "randomly select the time and frequency resources for SL-SCH and SCI of a sidelink grant from the selected resource pool." Conventionally, the random function shall be such that each of the allowed selections can be chosen with equal probability".

Figure 5D:
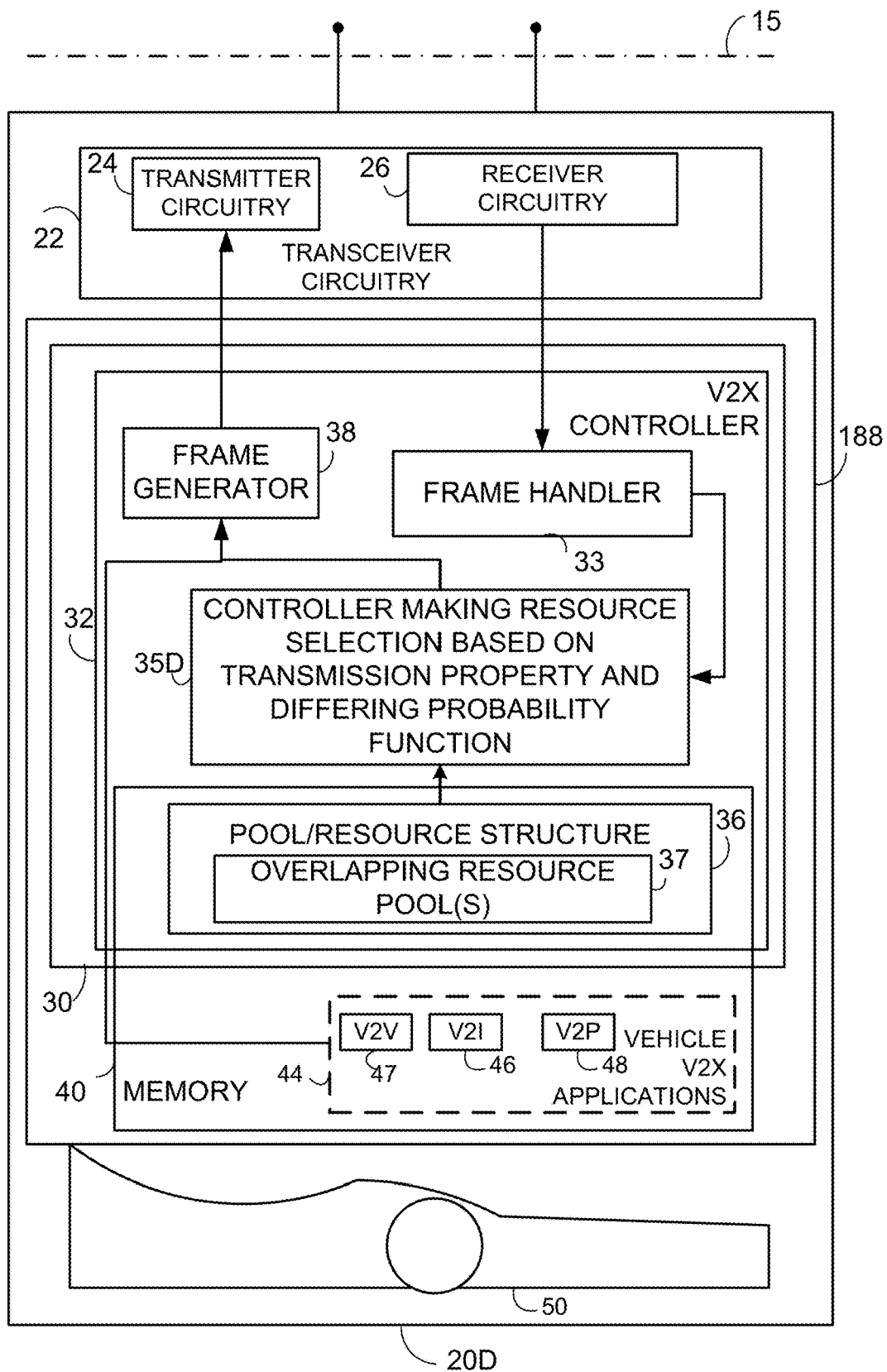

In the third example more specific embodiment the resource selection controller 35D of FIG. 5D is configured to make the selection of the selected radio resource based on transmission property of the V2X communication and by using a different or differentiated probability function. As a result, the selection of the radio resource from a pool is not purely random, but may be pseudo-random, e.g., by using a selection probability function that that is weighted in accordance with an expression/value of the transmission property of the V2X communication. In order to differentiate different types of transmission, the conventional random selection is thus enhanced and such that the enhanced or differentiated random function chooses each of the allowed selections, e.g., candidate radio resources, with different probability". The randomization probability is associated with type information. Accordingly FIG. 6D depicts by act 6D-1 the act of making the radio resource selection based on transmission property of the V2X communication and by using a different or differentiated probability function.

The enhanced random selection of this third more specific example embodiment enables a wireless terminal with some transmission property, e.g., high priority, to have more chance, e.g., more frequent chance, to access all resources or some part of resources. One form or mode of providing a different or differentiated probability function is to associate a parameter "txProbability" with a wireless terminal's transmission property, e.g., priority. The resource selection controller 35D of FIG. 5D selects a random value p1 in the range from 0 to 1, where the random function shall be such that each of the allowed selections can be chosen with equal probability. If p1 is less than txProbability, the UE randomly selects resources for transmission. Suppose that txProbability1 and txProbability2 are associated with high priority transmission and low priority transmission respectively, and that txProbability1=1 and txProbability2=0.5. Based on this assignment of txProbability values, and since P1 is generated with equal probability between 0 and 1, the high priority wireless terminal always can have a chance for transmission, while statistically, the low priority UE can only have a 50% chance to allow for resource selection. Thus, this third example more specific embodiment guarantees that the higher priority wireless terminal has more probability to select resources for transmission.

FIG. 9 is a schematic view according to an example mode of a mapping 59 of differentiated probability functions to corresponding plural expressions/values of transmission properties which may be used by the wireless terminal of FIG. 5D to make the selection of the selected radio resource. FIG. 9 reflects the scenario described above in which the higher priority $TBE_1$ has a txProbability1=1 and the lower priority $TBE_2$ has a txProbability2=0.5.

The mapping 59 of differentiated probability functions may be configured at the wireless terminal 20D, e.g., in memory 40, or obtained from a message (e.g., broadcast or RRC signaling) from another node of a radio access network (e.g., a base station or another wireless terminal).

In an example implementation, for sake of non-limiting illustration "priority" may be used as an example of the type information or transmission property. So in accordance with this third more specific embodiment the higher priority transmission has higher probability to use some resource selection, while lower priority transmission has lower probability to use the same resource selection, and thus different priority transmissions are differentiated from each other.

Fourth Example Embodiment

Figure 5E:
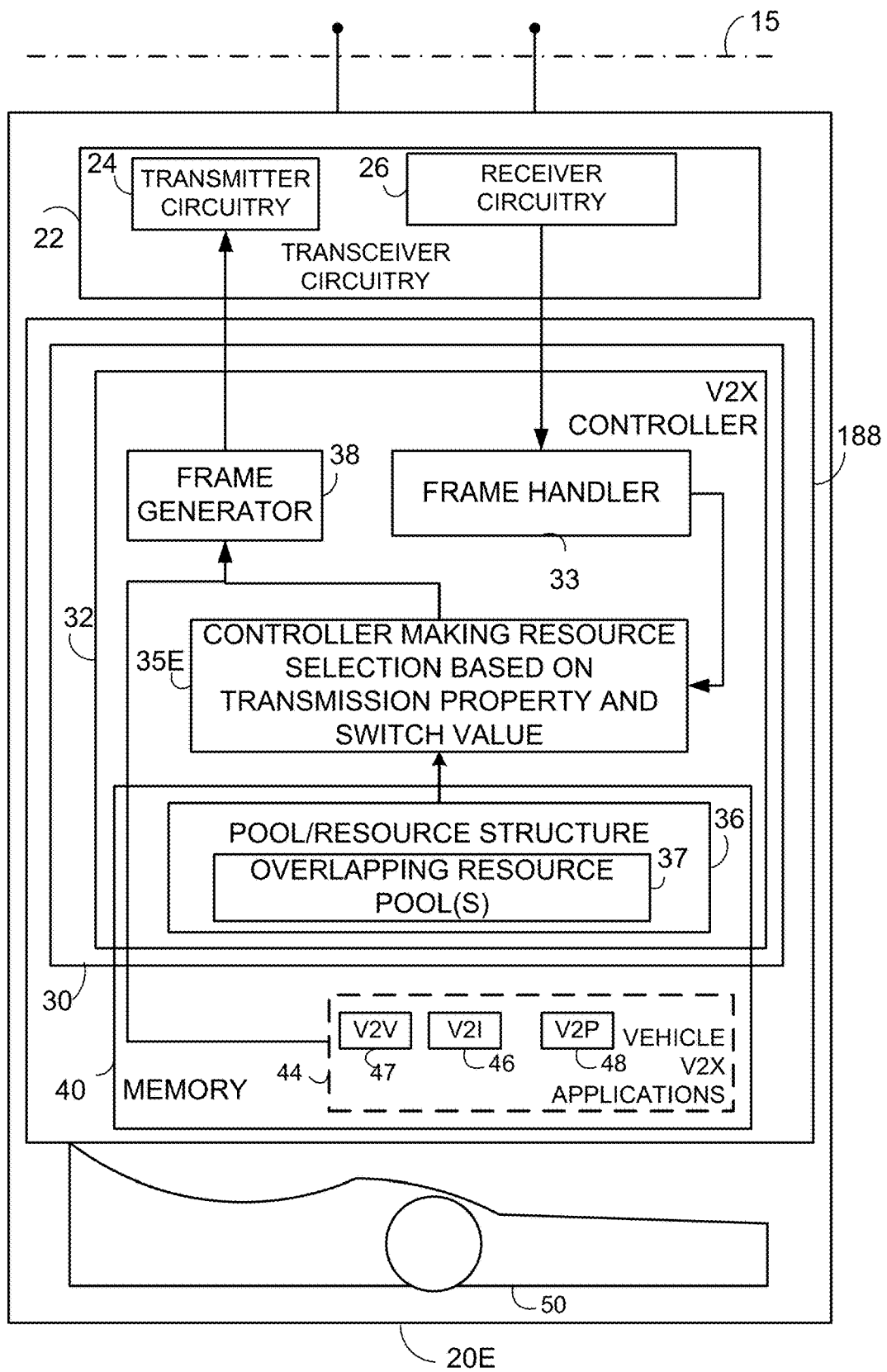

In the fourth example more specific embodiment the resource selection controller 35E of FIG. 5E is configured to make the selection of radio resource based on transmission property and a switch value. That is, resource selection controller 35E makes the selection of the selected radio resource by checking a switch value associated with an expression/value of the transmission property. Accordingly FIG. 6E depicts by act 6E-1 the act of making the radio resource selection based on transmission property of the V2X communication and a switch value.

The fourth example more specific embodiment thus controls each type of wireless terminal's transmissions by configuring an information element which acts as an ON/OFF switch. This "switch" IE may, for example, be configured to the UE with the same way as the above "Tx_EnergyThreshold" IE. The switch IE, e.g., the "On/Off Switch", may have a value of "On" and "Off", or "1" and "0" to represent "On" and "Off" respectively. Of course, the switch IE can also use "0" and "1" to represent "On" and "Off" respectively.

The resource selection controller 35E uses the mapping of the switch IE (with its plural switch values to corresponding plural expressions/values of transmission properties) to make the selection of the selected radio resource. FIG. 10A-FIG. 10C illustrate differing switch IEs for use with differing transmission properties. The switch IE of FIG. 10A shows switch values when the transmission property is priority, and particularly shows that the switch is "ON" only for V2X communications having highest priority "1". FIG. 10A assume that "priority 1" has higher priority than "priority 2", "1" means "On", and "0" means "Off", then this example actually describes a situation that only the highest priority transmission is allowed in the Type 1 resource pools. Alternatively, the switch IE of FIG. 10B shows switch values when the transmission property is service type, and particularly shows that the switch is "ON" only for a V2V communication (and not for V2P, V2I, P2V, or I2V communications. Alternatively, the switch IE of FIG. 10C shows switch values when the transmission property is travel direction, and particularly shows that the switch is "ON" only for a north (N) direction of travel (and not for west (w), south (S), or east (E), directions of travel.

The switch IEs of FIG. 10A, FIG. 10B, and FIG. 10C are provide non-limiting illustrations, as it should be understood that a switch IE may involve other transmission properties, and that any combination of switch values ("ON" or "OFF") may be assigned to members of the map The mapping 59 of differentiated probability functions may be configured at the wireless terminal 20D, e.g., in memory 40, or obtained from a message (e.g., broadcast or RRC signaling) from another node of a radio access network (e.g., a base station or another wireless terminal).

Figure 11:
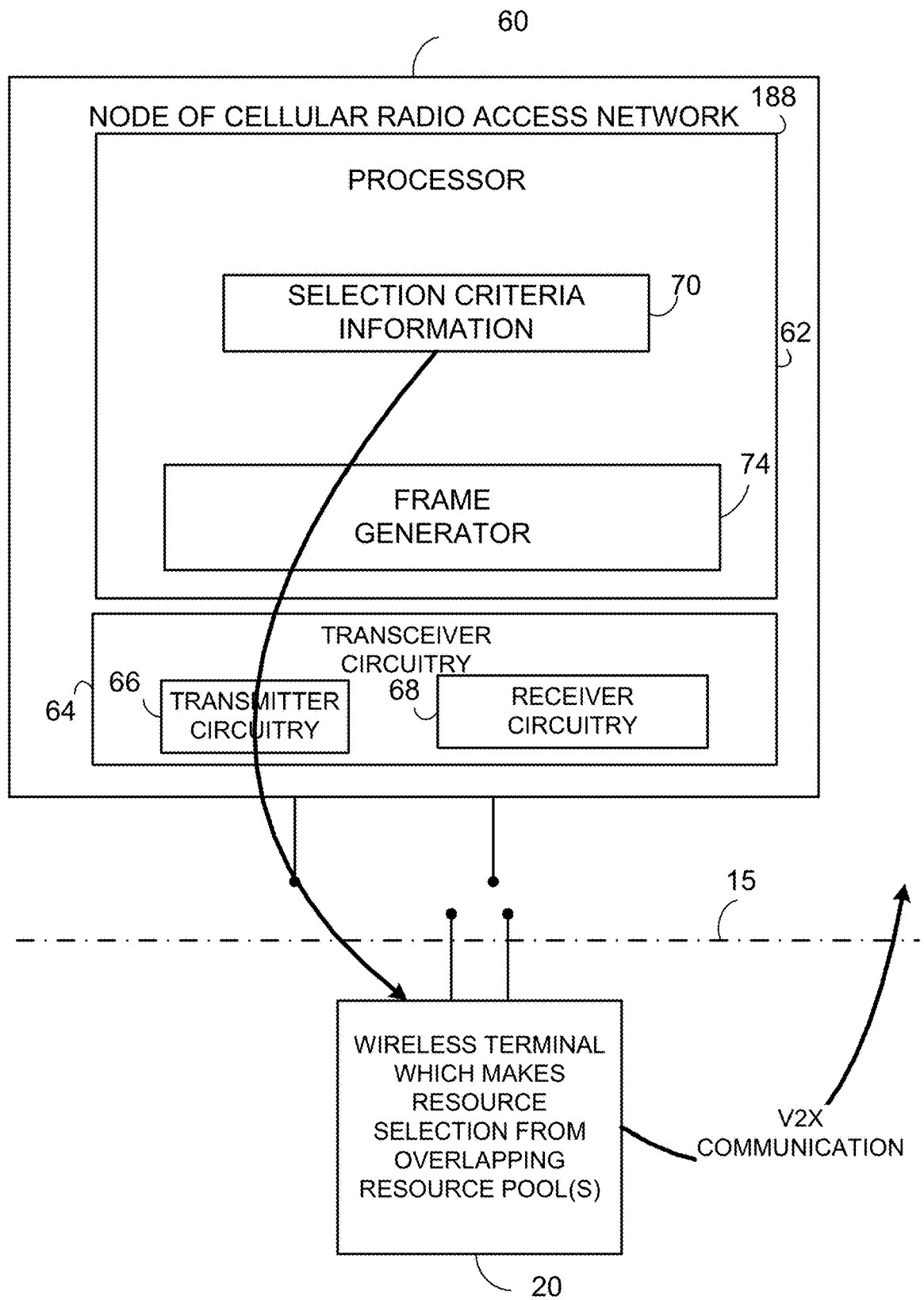
FIG. 11 is a schematic view of an example node of a cellular radio access network configured to transmit selection criteria to a wireless terminal to facilitate the wireless terminal selecting a data radio resource from an overlapping data resource pool based on a transmission property of the V2X communication.

FIG. 11 illustrates node 60 of a cellular radio access network which facilitates implementation of radio resource selection by a wireless terminal for vehicle (V2X) communications. The node 60 may be a base station node, such as an eNodeB (e.g., eNB) or gNB, for example, or another wireless terminal. The node 60 comprises processor circuitry 62 and transceiver circuitry 64. The transceiver circuitry 64 in turn comprises transmitter circuitry 66 and receiver circuitry 68. The processor circuitry 62 comprises radio resource selection information controller 70 and frame generator 74.

The radio resource selection information controller 70 provides provide selection criteria information to a wireless terminal, since the wireless terminal is configured to participate in a vehicle (V2X) communication. The selection criteria information comprising criteria to facilitate selection by the wireless terminal of a selected radio resource from the overlapping data resource pool based on a transmission property of the V2X communication In one example embodiment and mode the transmitter 66 is configured to transmit the selection criteria information to the wireless terminal in a broadcast message. In another example embodiment and mode the transmitter 66 is configured to transmit the selection criteria information to the wireless terminal in a radio resource control (RRC) message.

Fifth Example Embodiment

A fifth example embodiment and mode particularly encompasses but is not confined to vehicle-to-pedestrian (V2P) services. Power consumption is a key issue for pedestrian UEs (P-UEs). A V2P services in which a P-UE sends vehicle-to-X (V2X) messages but does not receive V2X messages is substantially more power efficient than a V2P service in which a P-UE receives V2X messages from vehicle UEs (V-UEs). Random resource selection for P-UEs potentially on a PC5 resource pool shared with V-UE transmissions, and sensing operation, may apply to P-UEs in this fifth example embodiment and mode. A pedestrian user equipment unit (P-UE) which, as mentioned above, participates in (e.g., sends or receives) V2X communications may be referred to as participating in P-UE related V2X communications, and such communications may also be referred to as P2V related V2X communications.

A system may support the possibility of random resource selection (without sensing) for a P-UE, at least for a P-UE not capable of sidelink Rx (and thus unable to perform SA decoding during sensing). If a P-UE uses random selection, the P-UE may have to use only pools in which random selection by P-UEs is permitted. On the other hand, the system may support the possibility to configure pools in which random selection by P-UEs is not permitted. But if random resource selection from a pool is permitted for a P-UE, it may be dependent upon network configuration whether a pool in which random selection by P-UEs is permitted overlaps with other pools.

According to the above, if a P-UE uses random selection, it may have to only use pools in which random selection by P-UE is permitted. Moreover, the specification may also support the possibility to configure pools in which random selection by P-UEs is not permitted. Therefore, multiple resource pools, instead of just one shared pool, should preferably be configured to at least P-UEs. Such resource pool information can be signaled (broadcast information signal or dedicated RRC signal) to the P-UE, or pre-configured in V-UE.

The legacy SIB18/SIB19 and resource pool related RRC signaling, as well as preconfigured resource pool information, may include a resource pool or a list of resource pools without any particular information indicating UE service type. As used herein, "UE service type" encompasses V-UE, or P-UE, or Infrastructure UE (I-UE), or Network UE (N-UE)). Thus, the UE service type may be s associated with a resource pool in either broadcast information, or dedicated RRC signaling, or pre-configuration. Of course, there can also be some common pools, which either has no association with any UE service type (meaning they could be shared by any UE service type), or associated with some types of UE service type (meaning they can only be shared by the associated service types of UEs).

One example is that there could be an information element (IE) like, "P-UE resource pool 1", "P-UE resource pool 2", etc. In this example, the resources pool(s) identified in a particular information element are associated with the service type indicated by the information element, as indicated either by, e.g., name or predefined convention. There may be more than one information element, and thus more than one pool, associated with a particular service type, as exemplified by "P-UE resource pool 1", "P-UE resource pool 2", etc.

As another example there may be a list of service types, e.g., "P-UE, V-UE, I-UE, N-UE", and there is another list of resource pool, e.g., "resource pool 1, resource pool 2, . . . ", so a mapping relationship is setup, e.g., one to one mapping, or some other predefined mapping relationship. So each service type of UE can know which resource pools it can use. If one resource pool is mapped by more than one UE service type, which means it is actually a common pool.

Since there may be no power issues for V-UEs, in the V2V WI, the V-UEs may be mandated to perform sensing before transmission. On the other hand, the requirements for P-UE transmission design may be that the P-UE transmission should not degrade the performance of existing V-UE transmission. If V-UE and P-UE share the same resource pool, and P-UEs are permitted to perform random resource selection without sensing, then no matter how V-UE does sensing for collision avoidance, it can only guarantee its own behaviors, and has nothing to do with P-UE. As a result, a P-UE has a high probability to collide with V-UE during resource selection, especially in the area where there is high density of UE distributions. The Packet Reception Ratio (PRR) performance of V-UE can inevitably be seriously affected. At the same time, in V2X resource selection design, our baseline is the current V2V design. If there are no special service requirements for particular service, normally the V2V design is reused, as I-UE and N-UE have no power concern as well. Hence, the resource pool(s) permitted for P-UE random selection may not be shared by V-UE, nor by I-UE and N-UE in V2I/V2N. In such case, the resource pool(s) permitted for P-UE random selection may be dedicated to P-UE.

As one aspect of the technology disclosed herein, an indicator such as one bit of flag in the broadcast information (e.g. system information), or dedicated RRC signaling, or pre-configuration, may be used to indicate whether random selection of a radio resource by a P-UE is mandated, or is permitted. There can also be another indication, such as another one bit flag in the broadcast information, or dedicated RRC signaling, or pre-configuration, to indicate whether sensing is mandated, or is permitted by a P-UE. These two indicators, e.g., two bits, can co-exist in the above information configuration method, or one of the indicators may exist in the above information configuration method.

Since the random selection should only be operated in the P-UE dedicated resource pool, the abovementioned flag bit(s) may only be pre-configured for P-UE only; in the relevant signaling (broadcast or dedicated), the abovementioned flag bit(s) is (are) applicable to P-UE only, which means only when the P-UE reads this information from network signaling configuration or pre-configuration, the P-UE needs to do one or more extra step(s) (compared with other service type of UE): either (1) checking whether the random selection is permitted (mandated) or not, (2) checking whether the sensing is permitted (mandated) or not, or (3) checking both (1) and (2).

Figure 5F:
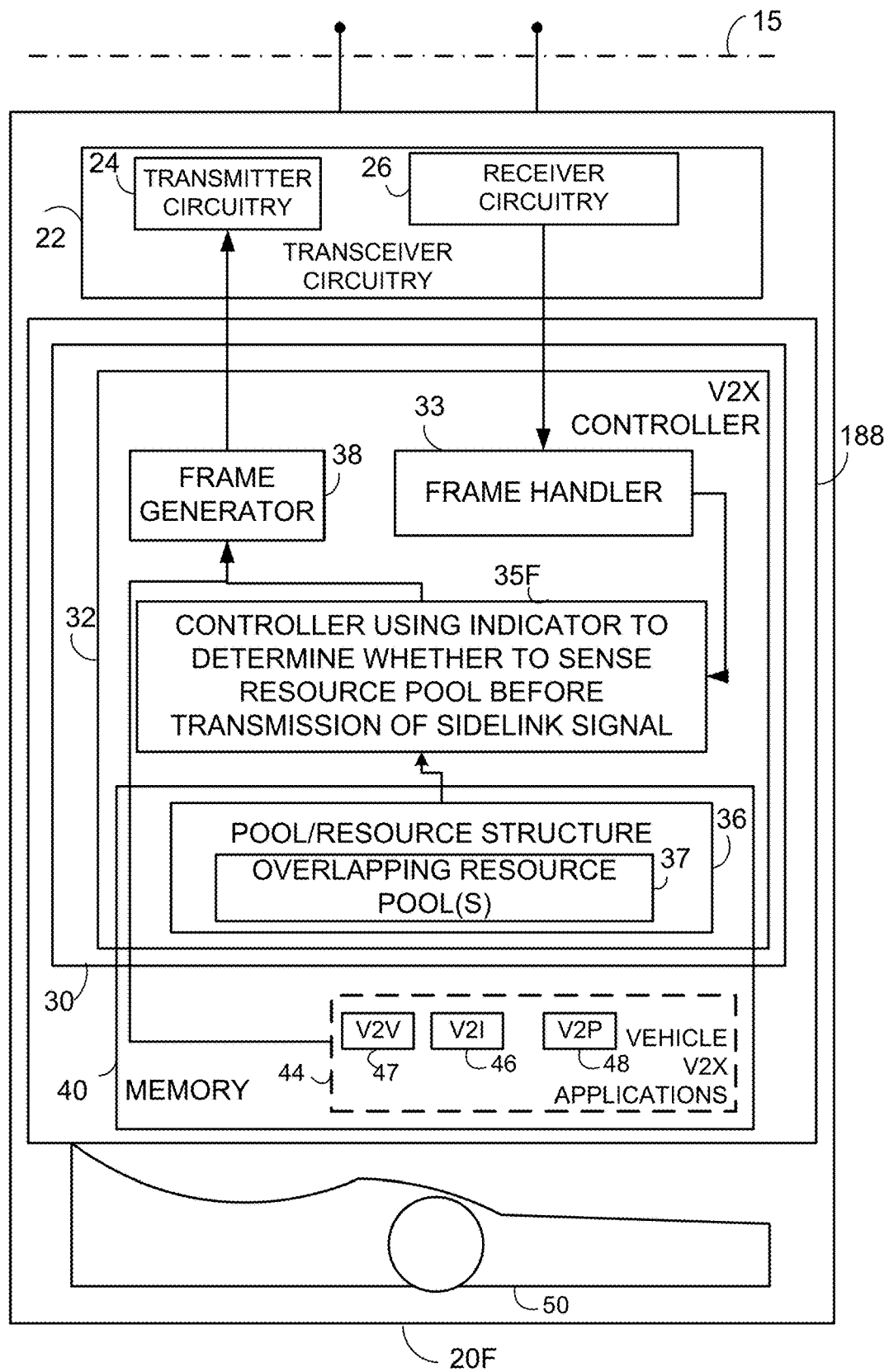
FIG. 5F is a schematic view of an example of a wireless terminal configured to determine whether a resource pool should be sensed before transmitting a sidelink signal.

FIG. 5F shows an example of a wireless terminal 20F configured to determine whether a resource pool should be sensed before transmitting a sidelink signal. In many respects the wireless terminal 20F of FIG. 5F resembles the wireless terminals of earlier embodiments by having similar units and functionalities. However, the wireless terminal 20F of FIG. 5F comprises controller 35F which determines whether a resource pool should be sense before transmitting a sidelink signal. The indicator or flag which provides the indication or command that the resource pool first be sensed may be obtained by frame handler 33 from, e.g., system information or signal (e.g., dedicated signal) received over the radio interface, or may be configured at the wireless terminal 20F.

FIG. 6F shows basic, representative acts or steps performed by the wireless terminal 20F of FIG. 5F. Act 6F-1 comprises obtaining an indicator, e.g., the flag which indicates whether pool sensing is required before transmission of a sidelink signal. Act 6F-2 comprises using the indicator to determine whether or not the UE needs to sense a resource pool before a transmitting a sidelink signal. If the indicator specifies that the UE does need to sense a resource pool before a transmitting a sidelink signal, as act 6F-3 the wireless terminal 20F senses the resource pool, and then (as act 6F-4) transmits the sidelink signal using a radio resource selected from an appropriate resource pool.

Only the P-UEs capable of and permitted to do sensing may be allowed to share resource pools with other service type UEs, e.g., V-UEs, I-UEs and N-UEs.

It may also be allowed that it is up to network configuration whether a pool in which random selection by P-UEs is permitted overlaps with other pools. Logically, the pool in which random selection by P-UEs is permitted is defined by two characteristics: "random selection" and "P-UE". If the above are adopted, then the possibility of pool overlapping only exists among pools with random selection and with sensing based random selection for P-UE only. If this is real, it means practically there is (are) resource pool(s) shared by P-UE permitted for random selection and P-UE permitted for sensing based random selection. This could be realized by dedicated signaling to different P-UE with flag bit(s). Whether the UE has sidelink Rx capability can also be helpful to achieve this target.

There may be problems not only related to UE's sidelink Rx capability, for example, but also related to priority issue. In a pool dedicated to P-UEs and shared by P-UEs with or without sensing behaviors, the P-UEs with random selection should have more chances to access resources than sensing based P-UEs. Moreover, P-UEs with random selection can make sure their resources may not be interfered by P-UEs with sensing based P-UEs, while the sensing based P-UEs cannot guarantee their resources that will not be interfered by P-UEs with random selection. Therefore, P-UEs with random selection can have higher priority.

Note that P-UE, V-UE, I-UE and N-UE may be differentiated with respect to UE capability (e.g. the 1st UE capability, the 2nd UE capability, the 3rd UE capability, the 4th capability corresponding to P-UE, V-UE, I-UE and N-UE, respectively), UE category, some kind of UE identity (e.g. RNTI) and/or information (e.g. velocity information) provided by upper layer.

Figure 12:
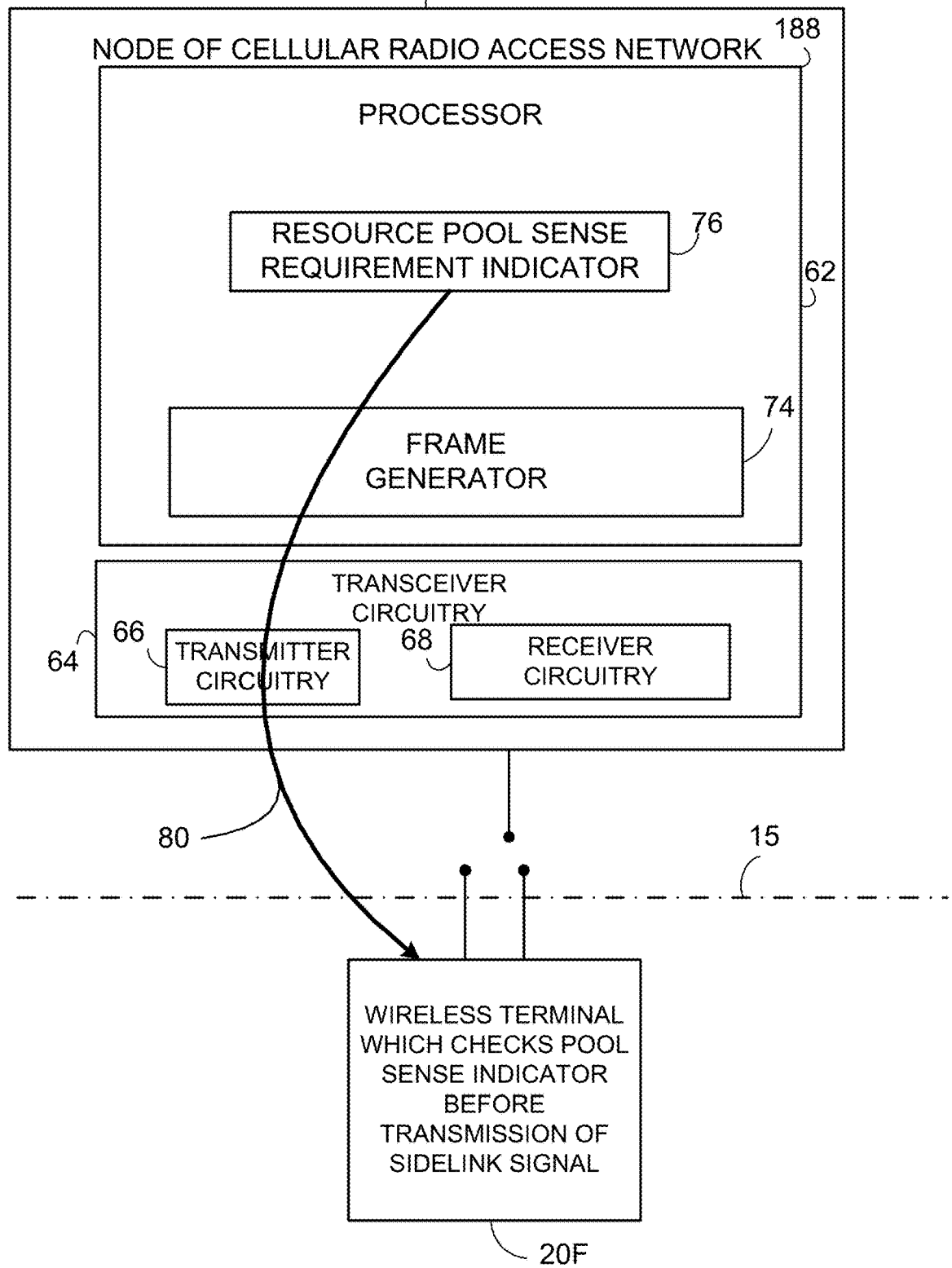
FIG. 12 is a schematic view of an example node of a cellular radio access network configured to transmit a resource pool sense indicator to a wireless terminal to facilitate the wireless terminal selecting a data radio resource.

In conjunction with the fifth example embodiment and mode of FIG. 5, FIG. 12 illustrates node 60(12) of a cellular radio access network which transmits a resource pool sense requirement indicator to a wireless terminal to facilitate the wireless terminal selecting a data radio resource. Like the node 60 of FIG. 11, node 60(12) may be a base station node, such as an eNodeB (e.g., eNB) or gNB, for example, or another wireless terminal. The node 60(12) comprises processor circuitry 62 and transceiver circuitry 64. The transceiver circuitry 64 in turn comprises transmitter circuitry 66 and receiver circuitry 68. The processor circuitry 62 comprises frame generator 74 and resource pool sense requirement indicator generator 76. The resource pool sense requirement indicator generator 76 is shown in FIG. 12 as generating a pool sense indicator 80, e.g., flag, which is received over the radio interface 15 by the wireless terminal 20F of FIG. 5F and used by the wireless terminal 20F to determine whether the wireless terminal 20F needs to sense the resource pool before transmission of a sidelink signal.

In one example implementation the transmitter 66 is configured to transmit the pool sense indicator 80 to the wireless terminal 20F in a broadcast message. In another implementation the transmitter 66 is configured to transmit the pool sense indicator 80 to the wireless terminal 20F in another type of signal, such as in a radio resource control (RRC) message or dedicated signal.

Certain units and functionalities of wireless terminal 20 may be implemented by terminal electronic machinery 88. FIG. 13 shows an example of such electronic machinery 188 as comprising one or more processors 190, program instruction memory 192; other memory 194 (e.g., RAM, cache, etc.); input/output interfaces 196; peripheral interfaces 198; support circuits 199; and busses 200 for communication between the aforementioned units. The processor(s) 190 may comprise the processor circuitries described herein, for example.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 40 shown in FIG. 5. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The technology disclosed herein thus comprises and compasses the following non-exhaustive example embodiments and modes:

Example Embodiment 1

A pedestrian user equipment (P-UE) which participates in P-UE related V2X communications, comprising:
processor circuitry configured:
to select a resource pool for a P-UE related V2X communication;
to determine, based on a first indicator and/or a second indicator:
whether to transmit the sidelink signal based on sensing using the selected resource pool; or
whether to transmit the sidelink signal based on random selection using the selected resource pool; and,
a transmitter configured to transmit the sidelink signal.

Example Embodiment 2

The apparatus of Example Embodiment 1, further comprising a receiver configured to receive the first indicator and/or the second indicator.

Example Embodiment 3

The apparatus of Example Embodiment 2, wherein the receiver is configured to receive the first indicator and/or the second indicator in system information broadcast over a radio interface.

Example Embodiment 4

The apparatus of Example Embodiment 1, further comprising a receiver configured to receive resource pool information which identifies one or more resource pools.

Example Embodiment 5

The apparatus of Example Embodiment 4, wherein the receiver is configured to receive the resource pool information in system information broadcast over a radio interface.

Example Embodiment 6

The apparatus of Example Embodiment 1, wherein resource pool information which identifies one or more resource pools is pre-configured at the P-UE.

Example Embodiment 7

The apparatus of Example Embodiment 1, wherein:
the first indicator is a one bit indicator which indicates whether the P-UE needs to sense the selected resource pool before transmission of a sidelink signal; and,
the second indicator is a one bit indicator which indicates whether random selection of a radio resource is permitted or mandated.

Example Embodiment 8

The apparatus of Example Embodiment 1, wherein one or both of the first indicator and the second indicator are pre-configured at the P-UE.

Example Embodiment 9

The apparatus of Example Embodiment 1, wherein the processor circuitry is configured to perform the selection of the radio resource from the selected resource pool based on a basis of the determination.

Example Embodiment 10

The apparatus of Example Embodiment 1, further comprising a sensor configured to sense the selected resource pool on the basis of which indicator(s) are received.

Example Embodiment 11

A method in a pedestrian user equipment (P-UE) which participates in P-UE related V2X communications, the method comprising:
  selecting a resource pool for a P-UE related V2X communication;
  making a determination, based on a first indicator and/or a second indicator:
    whether to transmit the sidelink signal based on sensing using the selected resource pool; or
    whether to transmit the sidelink signal based on random selection using the selected resource pool; and,
    transmitting the sidelink signal.

Example Embodiment 12

The method of Example Embodiment 11, further comprising receiving the first indicator and/or the second indicator in system information broadcast over a radio interface.

Example Embodiment 13

The method of Example Embodiment 11, further comprising receiving resource pool information which identifies one or more resource pools in system information broadcast over a radio interface.

Example Embodiment 14

The method of Example Embodiment 11, wherein the first indicator is a one bit indicator which indicates whether the P-UE needs to sense the selected resource pool before transmission of a sidelink signal.

Example Embodiment 15

The method of Example Embodiment 11, wherein the second indicator is a one bit indicator which indicates whether random selection of a radio resource is permitted or mandated.

Example Embodiment 16

The method of Example Embodiment 11, further comprising performing the selection of the selected radio resource from the selected resource pool based on a basis of the determination.

Example Embodiment 17

A node of a radio access node:
  processor circuitry configured to generate a first indicator and/or a second indicator configured to enable a pedestrian user equipment (P-UE) which participates in P-UE related V2X communications to determine, based on the first indicator and/or the second indicator:
    whether to transmit the sidelink signal based on sensing using a selected resource pool; or
    whether to transmit the sidelink signal based on random selection using the selected resource pool;
  a transmitter configured to transmit the first indicator and/or the second indicator over a radio interface to the P-UE.

Example Embodiment 18

The node of Example Embodiment 17, wherein the first indicator is a one bit indicator which indicates whether the P-UE needs to sense the selected resource pool before transmission of a sidelink signal.

Example Embodiment 19

The node of Example Embodiment 17, wherein the second indicator is a one bit indicator which indicates whether random selection of a radio resource is permitted or mandated.

It will be appreciated that the technology disclosed herein is directed to solving radio communications-centric issues and is necessarily rooted in computer technology and overcomes problems specifically arising in radio communications. Moreover, the technology disclosed herein improves basic function of a wireless terminal and a base station, so that, for example, operation of these entities may occur more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A user equipment (UE) that performs sidelink communication associated with pedestrian-UE related Vehicle-to-Everything (V2X) communication, the UE comprising:
  receiving circuitry configured to receive a broadcast message including first information and second information, the first information being used for indicating a plurality of resource pools, the second information being used for configuring resource selection for the sidelink communication,
  controlling circuitry configured to determine to use a first resource pool within the plurality of resource pools in a case that the second information indicates that random selection is used for the resource selection,
  transmitting circuitry configured to perform, based on the random selection, the sidelink communication using the first resource pool within the plurality of resource pools,
  wherein the plurality of resource pools includes the first resource pool for performing the sidelink communication associated with the pedestrian-UE related V2X communication and a second resource pool for performing a sidelink communication associated with non-pedestrian-UE related V2X communication.

2. The UE according to claim 1, wherein the non-pedestrian-UE is a vehicle-UE, an infrastructure-UE, or a network-UE.

3. A method for user equipment (UE) that performs sidelink communication associated with pedestrian-UE related Vehicle-to-Everything (V2X) communication, the method comprising:
receiving a broadcast message including first information and second information, the first information being used for indicating a plurality of resource pools, the second information being used for configuring resource selection for the sidelink communication,
determining to use a first resource pool within the plurality of resource pools in a case that the second information indicates that random selection is used for the resource selection,
performing, based on the random selection, the sidelink communication using the first resource pool within the plurality of resource pools,
wherein the plurality of resource pools includes the first resource pool for performing the sidelink communication associated with the pedestrian-UE related V2X communication and a second resource pool for performing a sidelink communication associated with non-pedestrian-UE related V2X communication.

4. A base station communicating with a user equipment (UE) that performs sidelink communication associated with pedestrian-UE related Vehicle-to-Everything (V2X) communication, the base station, comprising:
processor circuitry configured to generate a broadcast message including first information and second information, the first information being used for indicating a plurality of resource pools, the second information being used for configuring resource selection for the sidelink communication,
transmitting circuitry configured to transmit the broadcast message,
wherein the plurality of resource pools includes a first resource pool for performing the sidelink communication associated with pedestrian-UE related V2X communication and a second resource pool for performing a sidelink communication associated with non-pedestrian-UE related V2X communication,
wherein the first resource pool within the plurality of resource pools is determined for use in a case that the second information indicates that random selection is used for the resource selection.

5. The base station according to claim 4, wherein the non-pedestrian-UE is a vehicle-UE, an infrastructure-UE, or a network-UE.

6. A method for base station communicating with a user equipment (UE) that performs sidelink communication associated with pedestrian-UE related Vehicle-to-Everything (V2X) communication, the method comprising:
generating a broadcast message including first information and second information, the first information being used for indicating a plurality of resource pools, the second information being used configuring resource selection for the sidelink communication,
transmitting the broadcast message,
wherein the plurality of resource pools includes a first resource pool for performing the sidelink communication associated with the pedestrian-UE related V2X communication and a second resource pool for performing a sidelink communication associated with non-pedestrian-UE related V2X communication,
wherein the first resource pool within the plurality of resource pools is determined for use in a case that the second information indicates that random selection is used for the resource selection.

* * * * *